(12) United States Patent
Gniadek et al.

(10) Patent No.: US 7,526,172 B2
(45) Date of Patent: Apr. 28, 2009

(54) SPLITTER MODULES FOR FIBER DISTRIBUTION HUBS

(75) Inventors: Jeff Gniadek, Northbridge, MA (US); Tom LeBlanc, Fitchburg, MA (US); Yu Lu, Westborough, MA (US); Keith Millea, Sutton, MA (US); Randy Reagan, Clinton, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/762,300

(22) Filed: Jun. 13, 2007

(65) Prior Publication Data

US 2008/0124039 A1    May 29, 2008

Related U.S. Application Data

(63) Continuation of application No. 11/321,696, filed on Dec. 28, 2005, now Pat. No. 7,245,809.

(51) Int. Cl.
G02B 6/00    (2006.01)
(52) U.S. Cl. .................... 385/135; 385/134
(58) Field of Classification Search .................. 385/135
See application file for complete search history.

(56) References Cited

U.S. PATENT DOCUMENTS

| | | | | |
|---|---|---|---|---|
| 5,212,761 A * | 5/1993 | Petrunia ..................... 385/135 |
| 5,363,465 A | 11/1994 | Korkowski et al. |
| 5,432,875 A | 7/1995 | Korkowski et al. |
| 5,710,653 A | 1/1998 | Nemecek et al. |
| 5,790,738 A * | 8/1998 | Parzygnat ................... 385/134 |
| 5,793,909 A * | 8/1998 | Leone et al. .................. 385/24 |
| 6,049,709 A | 4/2000 | Anderson et al. |
| 6,196,026 B1 | 3/2001 | Anderson et al. |
| 6,208,796 B1* | 3/2001 | Williams Vigliaturo ..... 385/135 |
| 6,434,313 B1 | 8/2002 | Clapp, Jr. et al. |
| 6,496,640 B1 | 12/2002 | Harvey et al. |
| 6,535,681 B2* | 3/2003 | Daoud et al. ................ 385/134 |
| 6,556,763 B1 | 4/2003 | Puetz et al. |
| 6,560,394 B1 | 5/2003 | Battey et al. |
| 6,766,094 B2 | 7/2004 | Smith et al. |
| 6,768,860 B2 | 7/2004 | Liberty |
| 6,778,752 B2 | 8/2004 | Laporte et al. |
| 6,909,833 B2 | 6/2005 | Henschel et al. |
| 6,920,274 B2 | 7/2005 | Rapp et al. |
| 6,983,095 B2 | 1/2006 | Reagan et al. |
| 7,146,089 B2 | 12/2006 | Reagan et al. |
| 7,218,828 B2* | 5/2007 | Feustel et al. ............... 385/135 |
| 7,346,254 B2 | 3/2008 | Kramer et al. |
| 2002/0106177 A1 | 8/2002 | Flores et al. |
| 2002/0150370 A1* | 10/2002 | Battey et al. ................ 385/135 |
| 2003/0043970 A1 | 3/2003 | Witty et al. |

(Continued)

Primary Examiner—Frank G Font
Assistant Examiner—Ryan Lepisto
(74) Attorney, Agent, or Firm—Merchant & Gould P.C.

(57) ABSTRACT

A splitter module for a fiber distribution hub includes a main body with a first aperture configured to receive an input fiber entering the splitter module, and a second aperture configured for a plurality of distribution fibers exiting the splitter module. The splitter module also includes a fin configured to be received in a slot of a splitter tray of a fiber distribution hub, and a pin configured to engage a hole in the splitter tray. The fin is received in the slot, and the pin is received in the hole of the fiber distribution hub to couple the splitter module to the fiber distribution module.

19 Claims, 22 Drawing Sheets

U.S. PATENT DOCUMENTS

| | | |
|---|---|---|
| 2003/0072518 A1 | 4/2003 | Henschel et al. |
| 2003/0168235 A1 | 9/2003 | Loeffelholz et al. |
| 2003/0174996 A1 | 9/2003 | Henschel et al. |
| 2003/0223725 A1* | 12/2003 | Laporte et al. ............... 385/135 |
| 2003/0231849 A1 | 12/2003 | Rodriguez et al. |
| 2004/0001686 A1 | 1/2004 | Smith et al. |
| 2004/0109660 A1* | 6/2004 | Liberty ....................... 385/135 |
| 2004/0264873 A1 | 12/2004 | Smith et al. |
| 2005/0002633 A1 | 1/2005 | Solheid et al. |
| 2005/0105873 A1 | 5/2005 | Reagan et al. |
| 2005/0129379 A1* | 6/2005 | Reagan et al. ............... 385/135 |
| 2005/0135770 A1* | 6/2005 | McClellan et al. .......... 385/135 |
| 2005/0281526 A1* | 12/2005 | Vongseng et al. ............ 385/135 |
| 2006/0008231 A1 | 1/2006 | Reagan et al. |
| 2006/0029353 A1 | 2/2006 | Bolster et al. |
| 2006/0056782 A1 | 3/2006 | Elkins, II et al. |
| 2006/0093301 A1* | 5/2006 | Zimmel et al. ............... 385/135 |
| 2006/0165366 A1* | 7/2006 | Feustel et al. ................ 385/135 |
| 2006/0177190 A1 | 8/2006 | Vongseng et al. |
| 2006/0215962 A1 | 9/2006 | Henschel et al. |
| 2006/0269205 A1 | 11/2006 | Zimmel |
| 2006/0269206 A1 | 11/2006 | Zimmel |
| 2007/0189692 A1* | 8/2007 | Zimmel et al. ............... 385/135 |
| 2007/0230891 A1* | 10/2007 | Barth et al. ................. 385/135 |
| 2008/0080828 A1* | 4/2008 | Leon et al. .................. 385/135 |

* cited by examiner

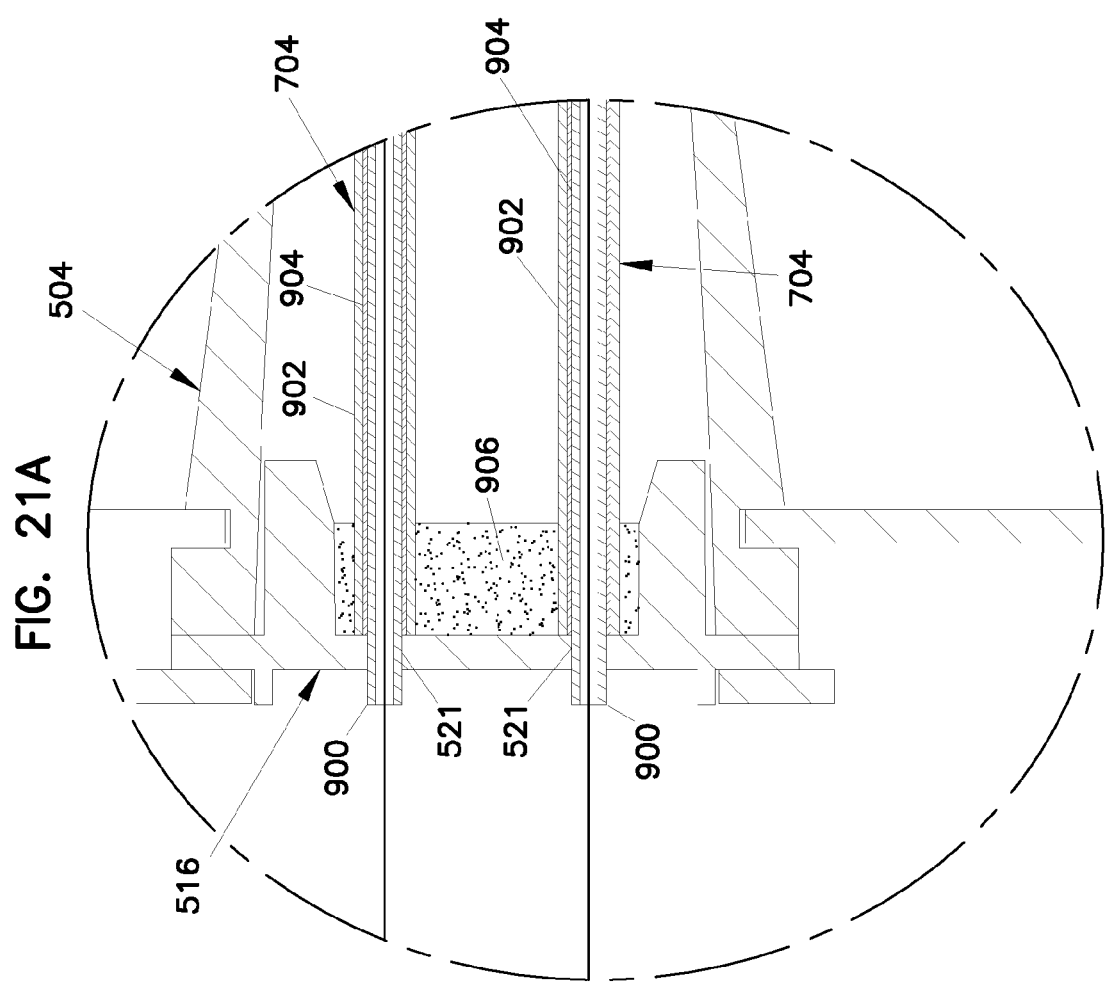

SPLITTER MODULES FOR FIBER DISTRIBUTION HUBS

RELATED APPLICATION

This application is a continuation of application Ser. No. 11/321,696, filed Dec. 28, 2005, the disclosure of which is hereby incorporated by reference.

TECHNICAL FIELD

The principles disclosed herein relate to fiber optic cable systems.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 110 that connects a number of end subscribers 115 (also called end users 115 herein) in a network. The central office 110 can additionally connect to a larger network such as the Internet (not shown) and a public switched telephone network (PSTN). The network 100 can also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits.

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations can include fewer or more fibers. The portion of network 100 that includes an FDH 130 and a number of end users 115 can be referred to as an F2 portion of network 100. The network 100 includes a plurality of break-out locations 125 at which branch cables are separated out from main cable lines. Branch cables are often connected to drop terminals 104 that include connector interfaces for facilitating coupling the fibers of the branch cables to a plurality of different subscriber locations.

Splitters used in an FDH 130 can accept a feeder cable having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 130 as required.

SUMMARY

Certain aspects of the disclosure relate to fiber optic cable systems.

In example systems, a fiber distribution hub includes one or more optical splitter modules that split an optical signal into two or more signals. The splitter modules are modular, and a plurality of splitter modules can be included in the fiber distribution hub. Splitter modules can be added to or removed from the fiber distribution hub as needed.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DESCRIPTION OF THE DRAWINGS

FIG. 21A is an enlargement of a portion of FIG. 21.

DETAILED DESCRIPTION

Figure 2:
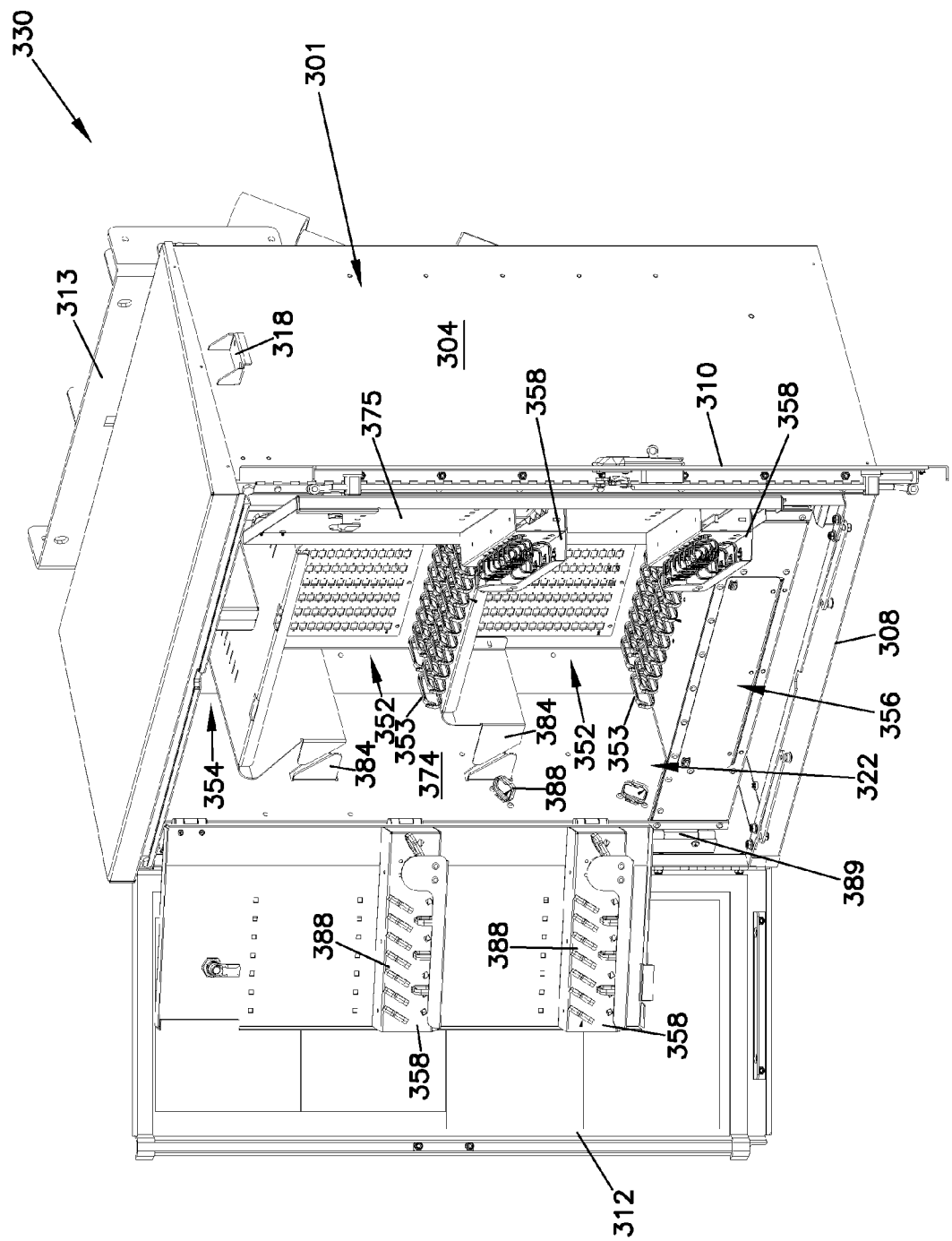
FIG. 2 shows a perspective view of an example fiber distribution hub.
Figure 3:
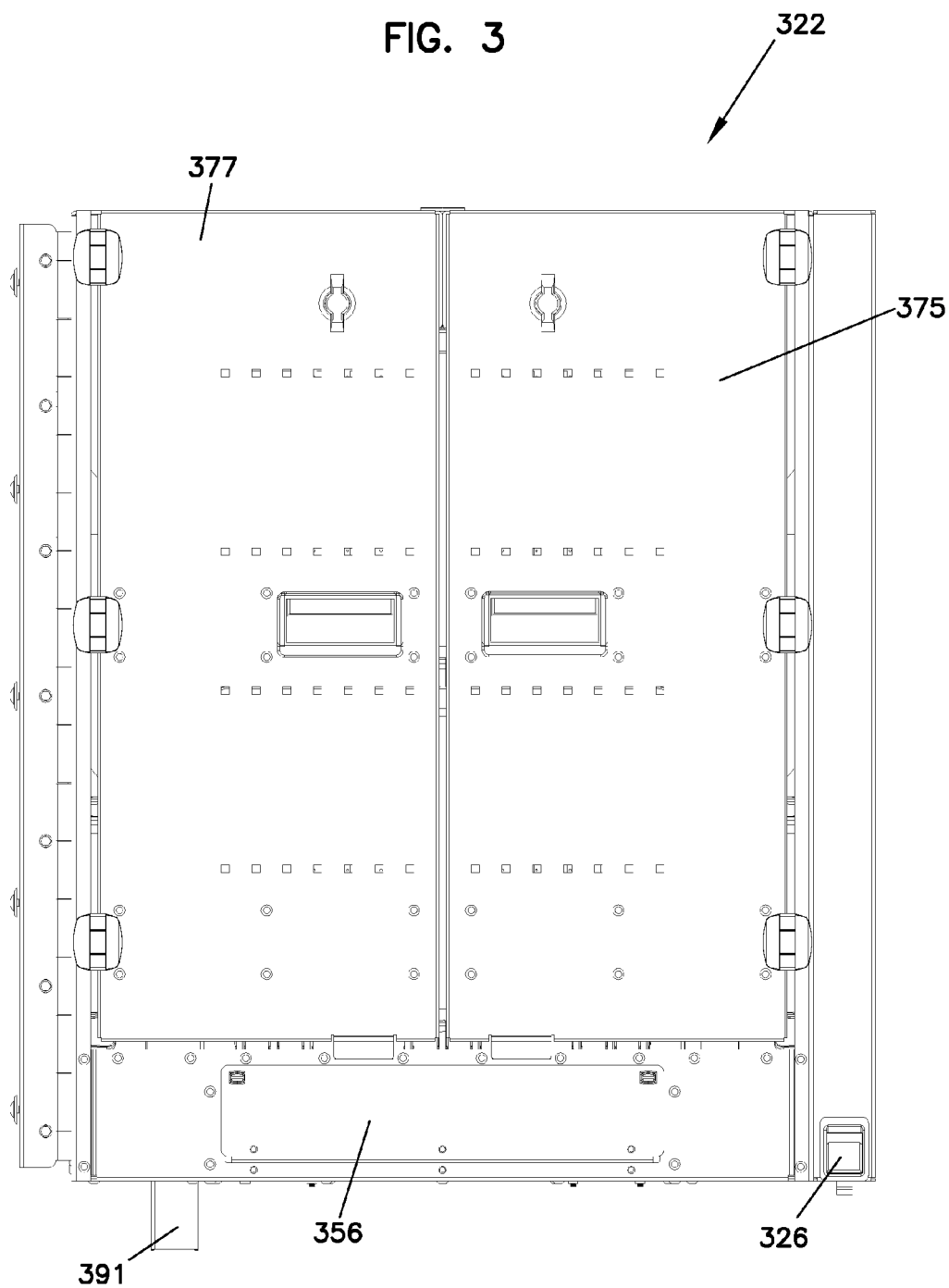
FIG. 3 shows a front view of an example swing frame chassis of the fiber distribution hub of FIG. 2.

Referring now to FIG. 2, an example fiber distribution hub (FDH) 330 is shown. FDH 330 generally administers connections between fiber optic cables and passive optical splitters in an Outside Plant (OSP) environment. FDH 330 provides a cross-connect/interconnect interface for optical transmission signals at a location in the network where operational access, and reconfiguration are desired. For example, as noted above, FDH 330 can be used to splice one or more feeder cables, split the feeder cables, and terminate the split feeder cables to distribution cables. In addition, FDH 330 is designed to accommodate a range of alternative sizes and fiber counts and support factory installation of pigtails, fanouts and splitters.

FDH 330 includes an example outer enclosure 301 that houses internal components, as described further below. In one embodiment, enclosure 301 includes a top panel 302, a first side panel 304, a second side panel (not shown), a bottom panel 308, a back panel (not shown), a first door 310, and a second door 312. In addition, enclosure 301 can include one or more carry handles 318 for facilitating deployment of enclosure 301 at a desired location. First and second doors 310, 312 are each pivotally mounted to facilitate access to components mounted within enclosure 301.

Enclosure 301 of FDH 330 is typically manufactured from heavy gauge aluminum and is NEMA-4X rated. Enclosure 301 is configured to provide protection against rain, wind, dust, rodents and other environmental contaminants. At the same time, enclosure 301 remains relatively lightweight for easy installation, and breathable to prevent accumulation of moisture in the unit. An aluminum construction with a heavy powder coat finish also provides for corrosion resistance. Other materials can be used.

In accordance with example embodiments, FDH 330 is provided in pole mount or pedestal mount configurations. For example, as shown in FIG. 2, a bracket 313 mounted to the back panel of FDH 330 can be used to mount FDH 330 to a pole.

Three sizes of FDH 330 are typically available, for example, to correspond to three different feeder counts including, for example, 144, 216, and 432. Alternative sizes for FDH 330 can be used without limitation. Embodiments of FDH 330 can provide termination, splicing, interconnection, and splitting in one enclosure.

Referring now to FIGS. 2-11, mounted within enclosure 301 of FDH 330 is a swing frame chassis 322. Chassis 322 includes first and second doors 375, 377, side panels 372, 374, a bottom panel 399, and a back panel 376. Doors 375, 377 can be swung from a closed position (FIG. 3) to an open position (FIGS. 4 and 5) to allow for access to the internal components of chassis 322.

Generally, chassis 322 includes a front bulkhead 335 with a feeder cable connection region 356, a splitter shelf 354, and a distribution cable connection region 352. The chassis 322 also includes parking panels 379.

Figure 1:
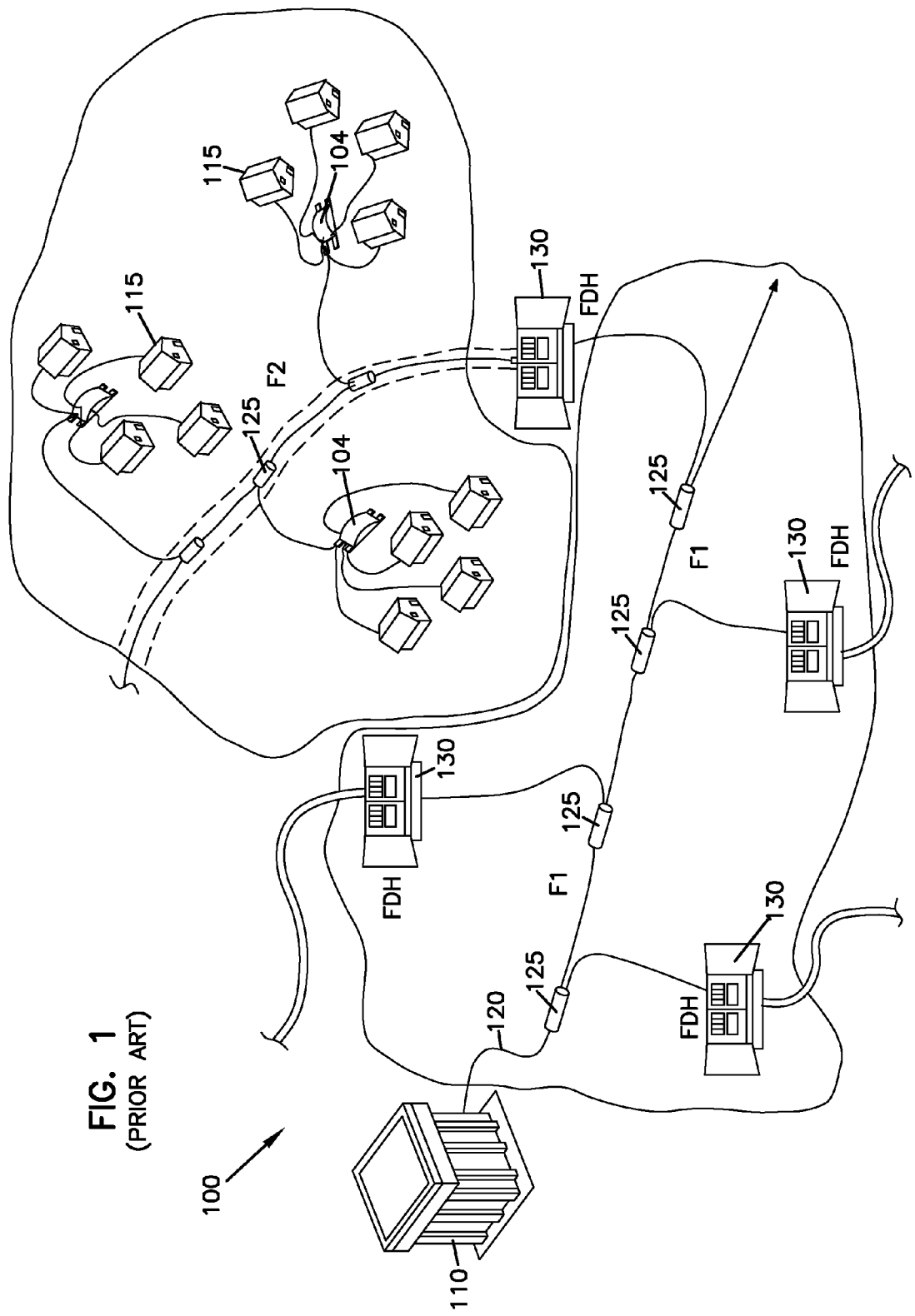
FIG. 1 shows a prior art passive fiber optic network.
Figure 12:
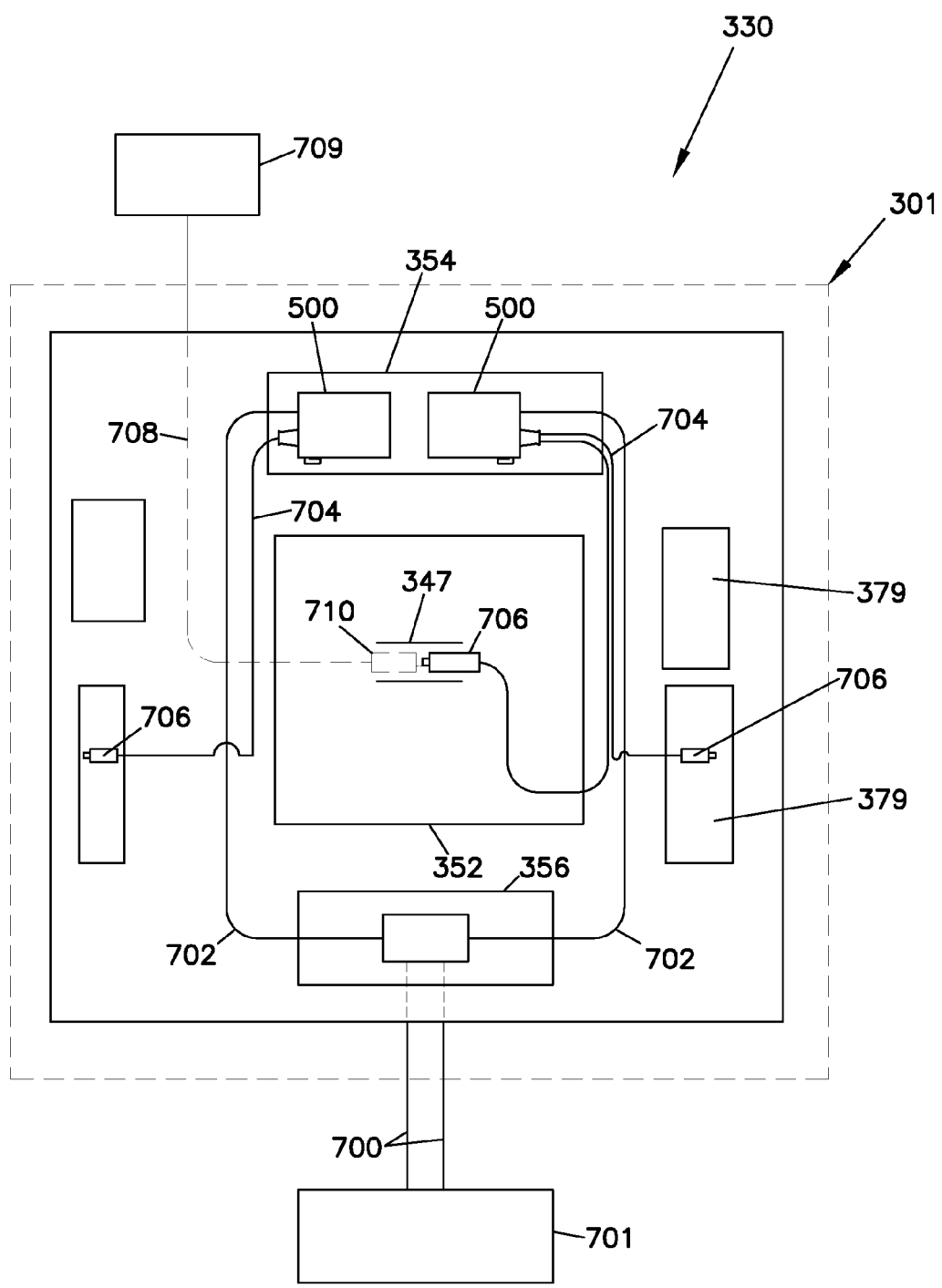
FIG. 12 is a schematic diagram showing an example cable routing scheme for the fiber distribution hub of FIG. 2.

FIG. 12 is a schematic diagram showing an example cable routing scheme for the FDH 330. As shown at FIG. 12, a feeder cable 700 is initially routed into the FDH 330 through enclosure 301 (e.g., typically through the back or bottom of the enclosure 301). An example feeder cable may include 12 to 48 individual fibers connected to a service provider central office 701. Once within the enclosure, the fibers of the feeder cable 700 are routed to the feeder cable connection region 356. At the feeder cable connection region 356, one or more of the fibers of the feeder cable 700 are individually connected to separate splitter input fibers 702 routed from the feeder cable connection region 356 to splitter shelf 354. At splitter shelf 354, splitter input fibers 702 are connected to separate splitter modules 500, wherein the input fibers 702 are each split into a plurality of pigtails 704 having connectorized ends 706. When pigtails 704 are not in service, connectorized ends 706 can be temporarily stored at one of the connector storage panels 379. When pigtails 704 are needed for service, pigtails 704 are routed from splitter modules 500 to the distribution cable connection region 352. At the distribution cable connection region 352, pigtails 704 are connected to the fibers of a distribution cable 708. A typical distribution cable can form the F2 portion of a network (see FIG. 1) and typically includes a plurality of fibers (e.g., 144, 216 or 432 fibers) that are routed from the FDH 330 to subscriber locations 709.

Referring to FIGS. 3-6, feeder cable connection region 356 of FDH 330 is located at a bottom portion of the chassis 322. The fibers of the feeder cable/cables 700 can enter the feeder cable connection region 356 through an opening 382 formed in the back panel 376 of the chassis 322 (see FIG. 6). At feeder cable connection region 356, one or more fibers of the feeder cable 700 are connected to the splitter input fibers 702. The splitter input fibers 702 can be connected to the fibers of feeder cable 700 by splices. Alternatively, the fibers of feeder cable 700 and splitter input fibers 702 may be connectorized and connected to one another by a spliceless connection at feeder cable connection region 356. For example, the region 356 can include a patch panel having adapters for interconnecting connectorized ends of the feeder cable fibers with connectorized ends of the of splitter input fibers 702. Splitter input fibers 702 can be routed out the sides of feeder cable connection region 356 to exit feeder cable connection region 356. Upon exiting feeder cable connection region 356, input fibers 702 can be routed upwardly along side panels 372, 374 of chassis 332 to splitter shelf 354.

The fibers of the feeder cable 700 can be protected within the chassis by loose buffer tubes. In certain embodiments, the fibers of the feeder cable 700 can include ribbon fibers. Fanout blocks can be provided at the feeder cable connection region 356 for fanning the ribbon cables into individual separate fibers that may be connected to the splitter input fibers at the feeder cable connection region 356. The individual fibers may be connectorized or unconnectorized.

Figure 4:
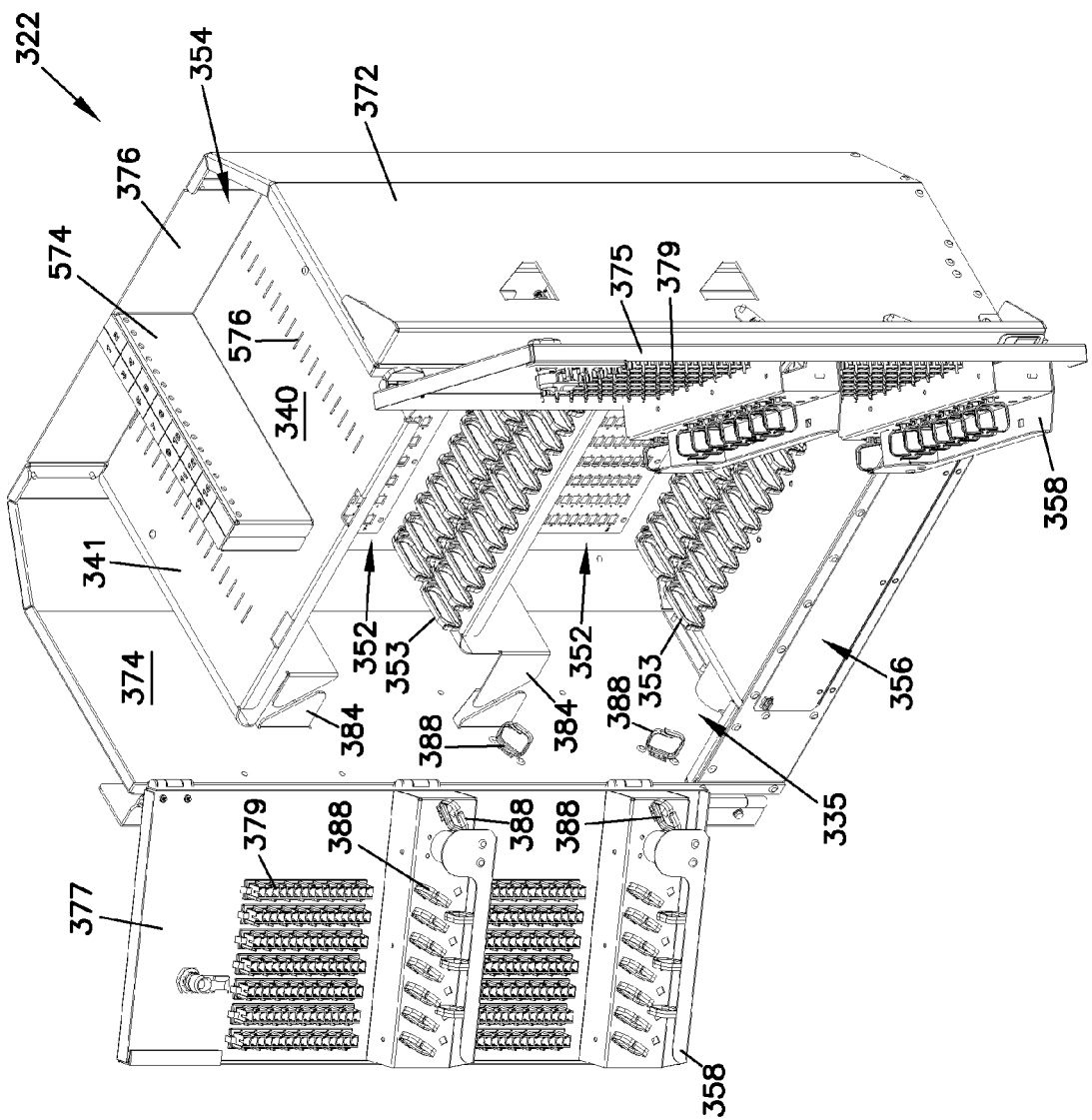
FIG. 4 shows a perspective view of the swing frame chassis of FIG. 3 with the chassis doors in open positions.
Figure 9:
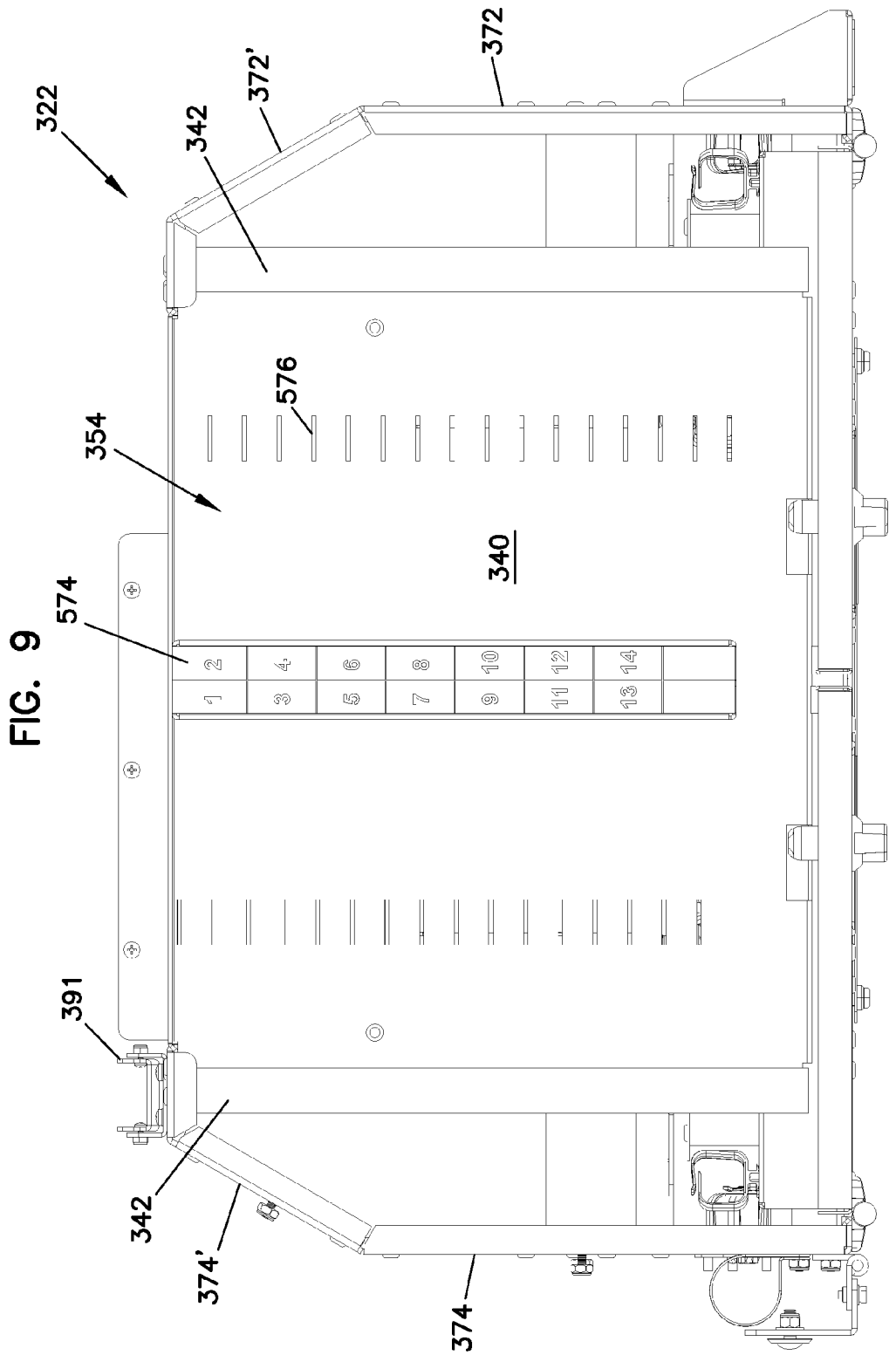
FIG. 9 shows a top view of the swing frame chassis of FIG. 3.
Figure 19:
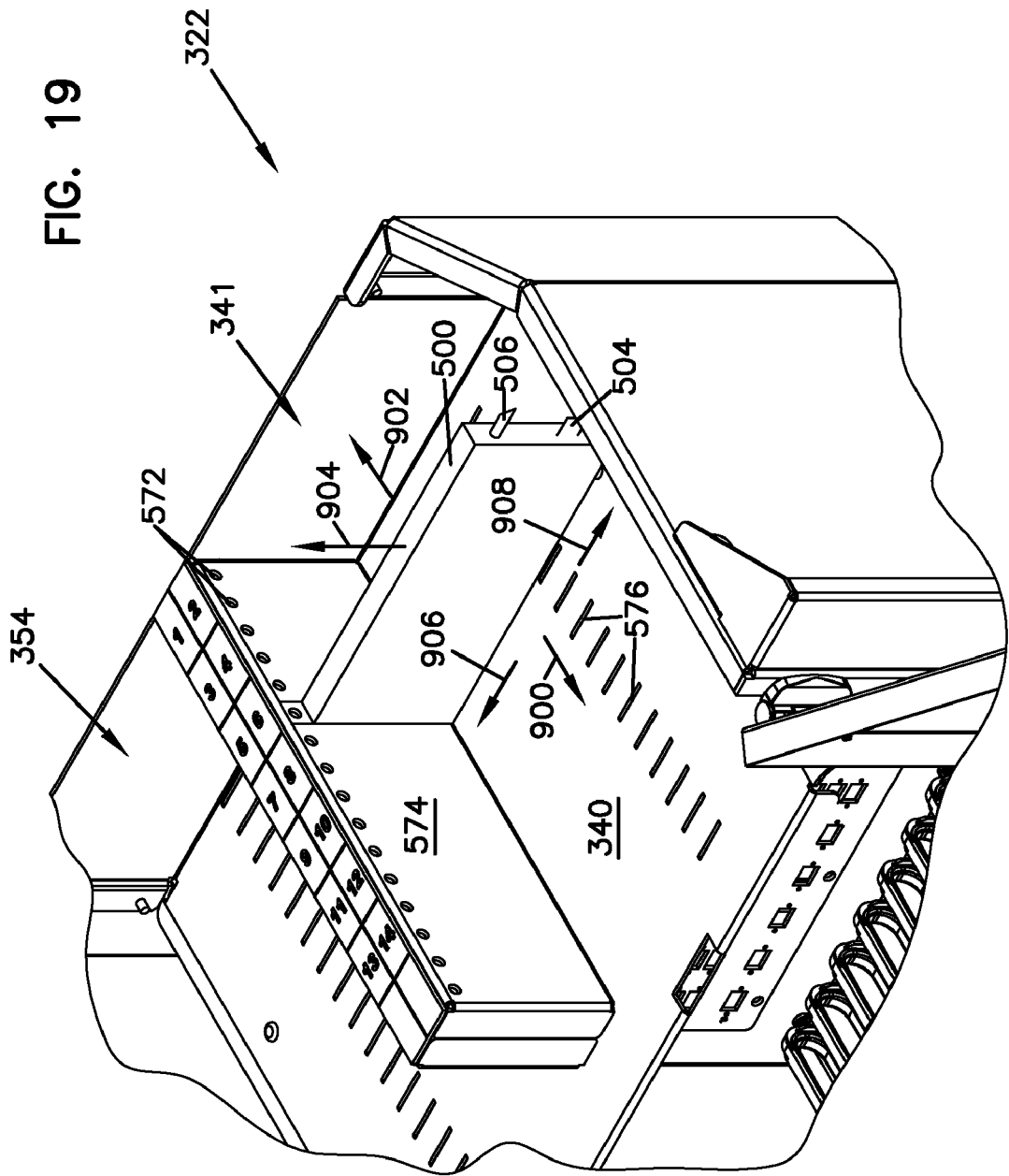
FIG. 19 shows a perspective view of a portion of the swing frame chassis of FIG. 4 with the optical splitter module of FIG. 13 mounted thereto.

Splitter shelf 354 of the FDH 330 can serve to protect, organize, and secure splitter modules of FDH 330. Splitter shelf 354 can be constructed in various sizes to accommodate different numbers of splitter modules. Referring to FIGS. 4, 9, and 19, splitter shelf 354 defines one or more locations sized to accept one or more optical splitter modules (see, e.g., splitter modules 500 and 600 described below). In the depicted embodiment, splitter shelf 354 is located at a top portion of the chassis 322 and includes a generally horizontal shelf member 340. A splitter mounting region 341 is located above the shelf member 340. A vertical wall structure 574 projects upwardly from the shelf member 340 and divides splitter mounting region 341 into two halves.

The splitter input fibers 702 and pigtails 704 are routed laterally through open sides of splitter shelf 354 to access the splitter mounting region 341. Radius limiters 342 (see FIGS. 4 and 5) are provided at the open sides for limiting bending of the fibers as fibers 702, 704 are routed to or from splitter mounting region 341.

In example embodiments, the splitter modules are designed to snap into shelf 354 and therefore can be added incrementally into splitter mounting region 341 as needed. In one embodiment, the splitter modules are incrementally loaded into the splitter mounting region 341 from front to back. To accommodate the splitter modules, shelf 354 includes structure for supporting/securing the splitter modules. For example, vertical wall structure 574 includes a plurality of holes 572 adapted to receive fasteners for securing the splitter modules to splitter shelf 354. Additionally, horizontal shelf member 340 includes a plurality of slots 576 for receiving securing elements (e.g., hooks, tongues, brackets, tabs, fins or other structures) of splitter modules to secure the modules to splitter shelf 354. The securement arrangement is adapted to limit movement of the splitter modules relative to the splitter shelf after installation so that the fibers routed to the splitter modules are not disturbed.

Figure 5:
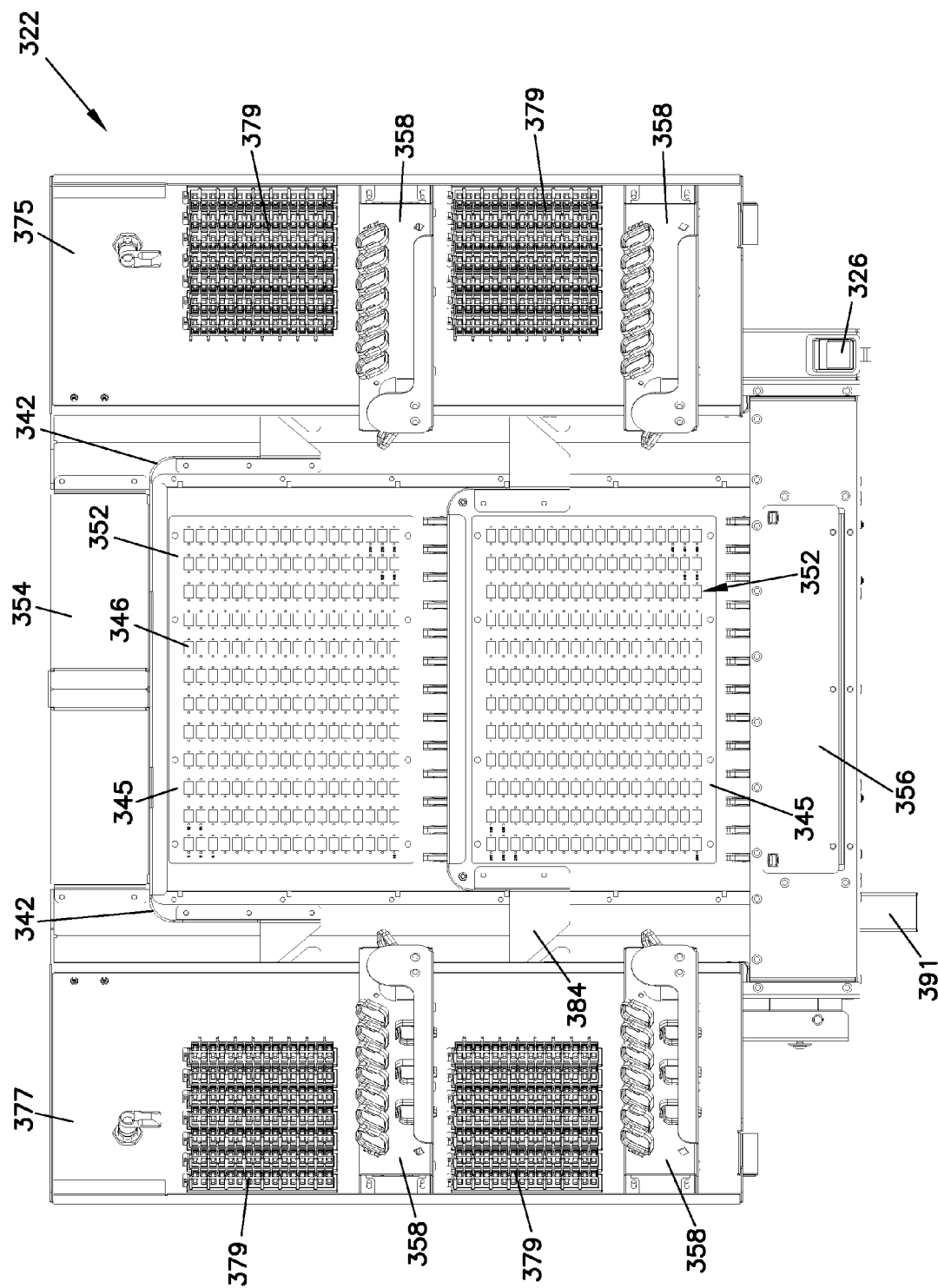
FIG. 5 shows a front view of the swing frame chassis of FIG. 4.
Figure 6:
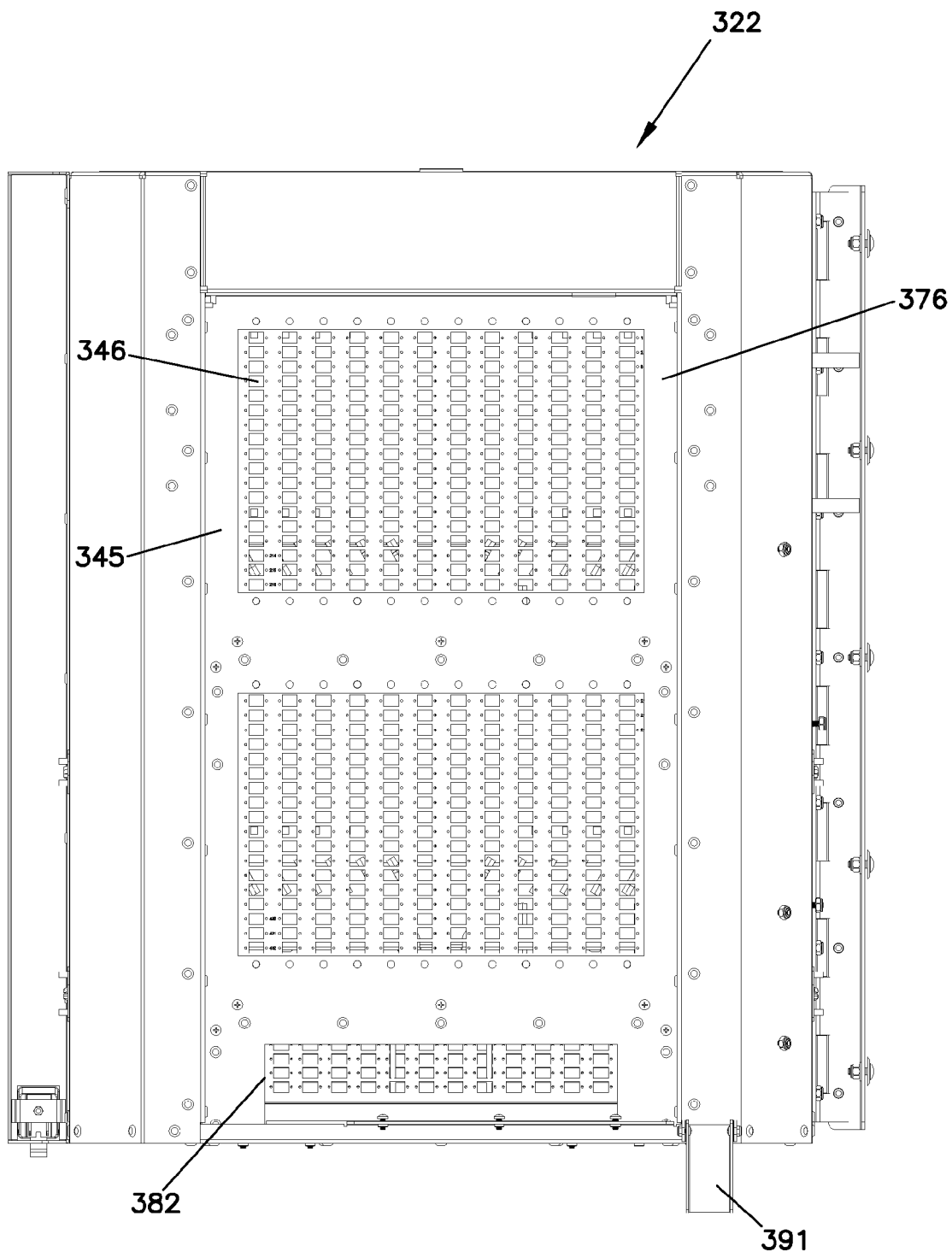
FIG. 6 shows a back view of the swing frame chassis of FIG. 3.
Figure 7:
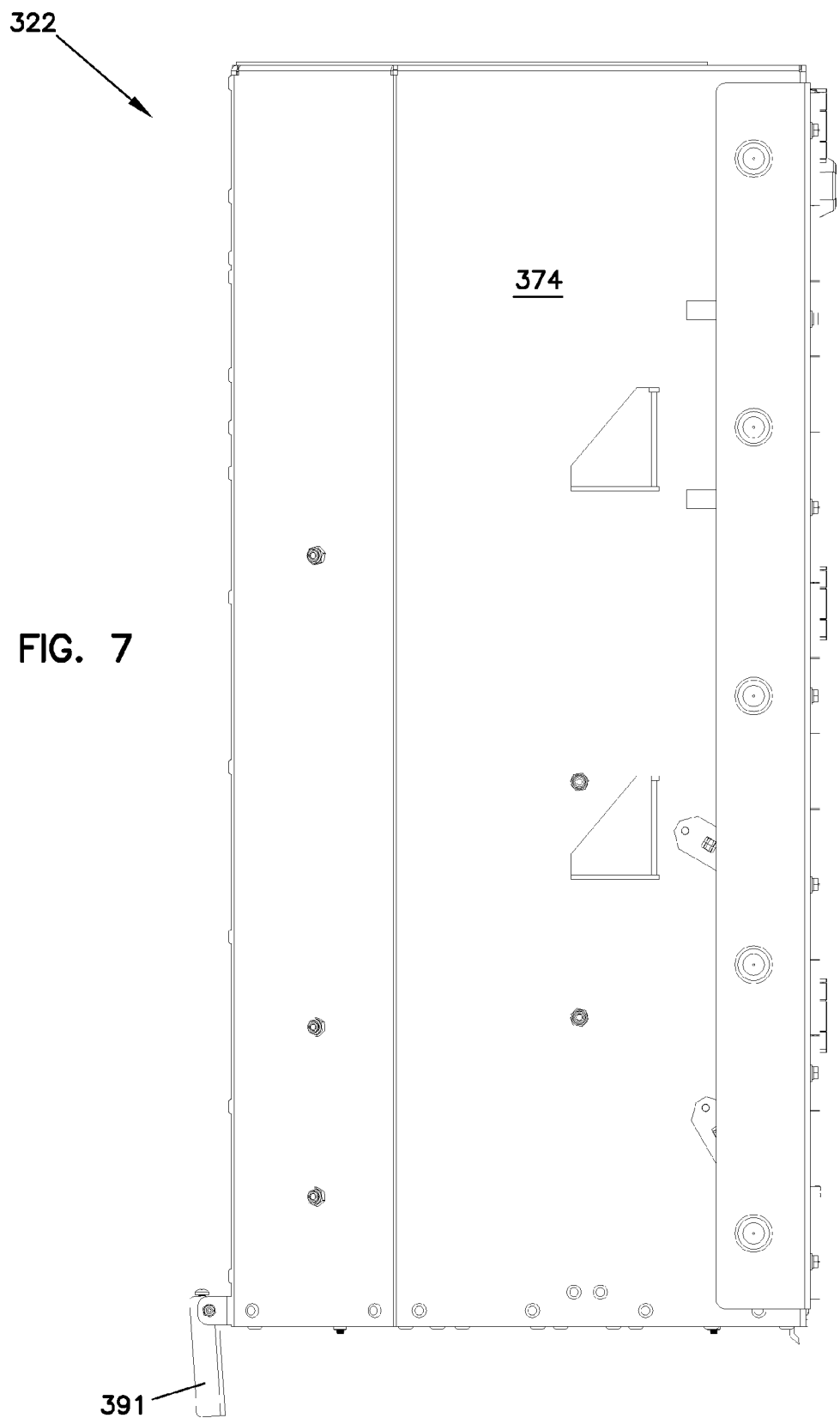
FIG. 7 shows a side view of the swing frame chassis of FIG. 3.
Figure 8:
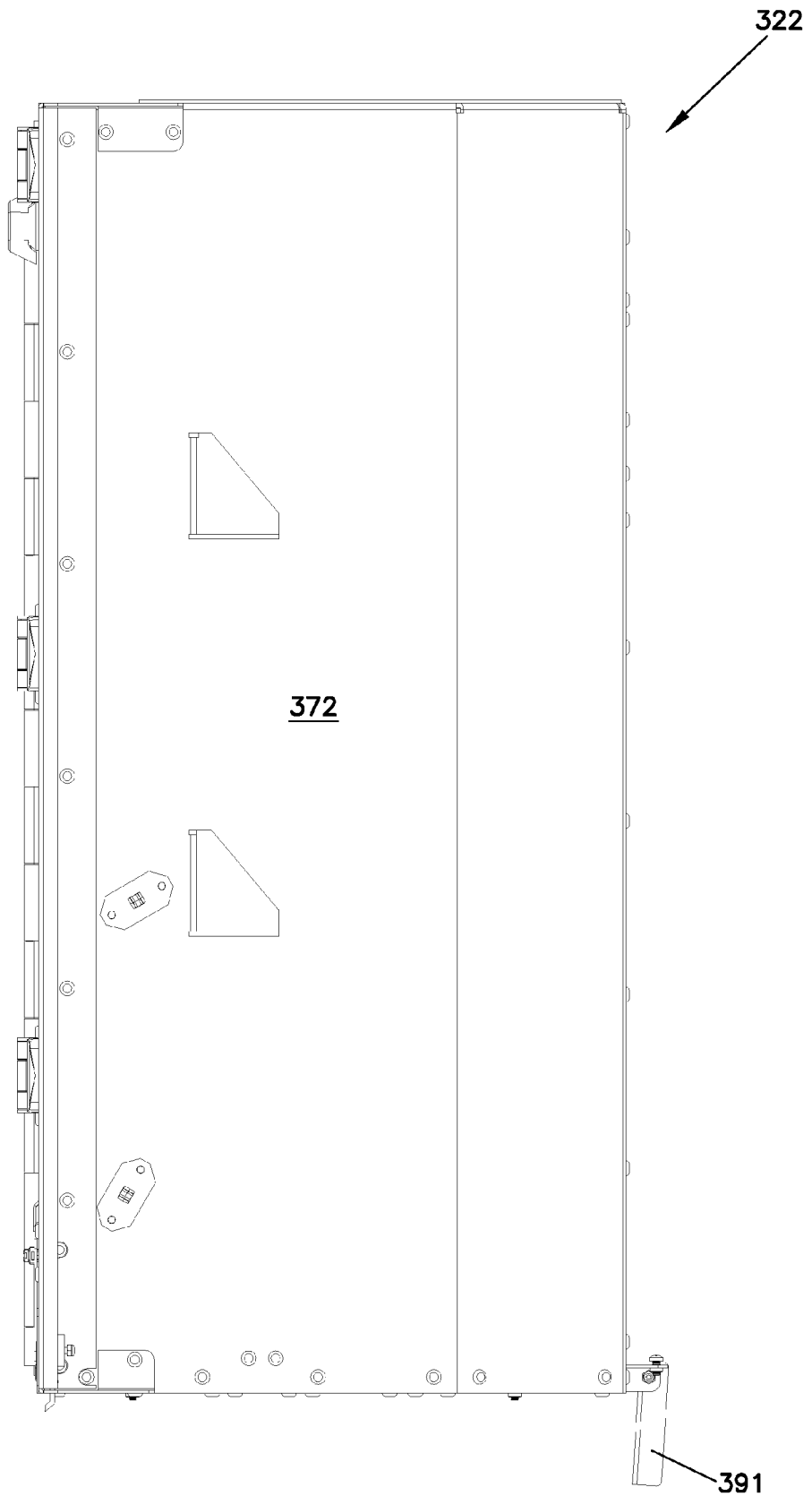
FIG. 8 shows another side view of the swing frame chassis of FIG. 3.

Referring to FIGS. 5 and 6, the distribution cable connection region 352 of the FDH 330 is depicted as including termination panels 345 having openings 346 for receiving adapters. The adapters provide means for interconnecting pigtails 704 to the fibers of distribution cable 708. In one embodiment, the fibers of the distribution cable 708 are connectorized so that the adapters can be used to provide spliceless connections between the connectorized ends 706 of the pigtails 704 and the connectorized ends of distribution cable fibers. As shown schematically at FIG. 12, an adapter 347 is depicted at the distribution cable connection region 352. The adapter 347 is shown providing a connection between a connectorized end 706 of one of pigtails 704 and a connectorized end 710 of one of the distribution cable fibers. The connectorized end 706 of pigtail 704 is inserted into the front end of adapter 347, and connectorized end 710 of a distribution cable fiber is inserted in the back end of adapter 347. Typically, the front ends of the adapters are accessible from the front sides of the termination panels 345, while the back ends of the adapters are accessible from the back sides of the termination panels 345.

The fibers of the distribution cable 708 can include first portions 713 (see FIG. 11) that extend from the connectorized ends 710 to fan-out blocks 715 mounted on shelves 717 (see FIG. 11) located at the back sides of the termination panels 345. The first portions 713 may also have extra lengths that are coiled and stored at the shelves 717. Spools, clips, holders, brackets or other cable management structures can also be provided at the shelves 717 to facilitate managing the fibers of the distribution cable.

Figure 10:
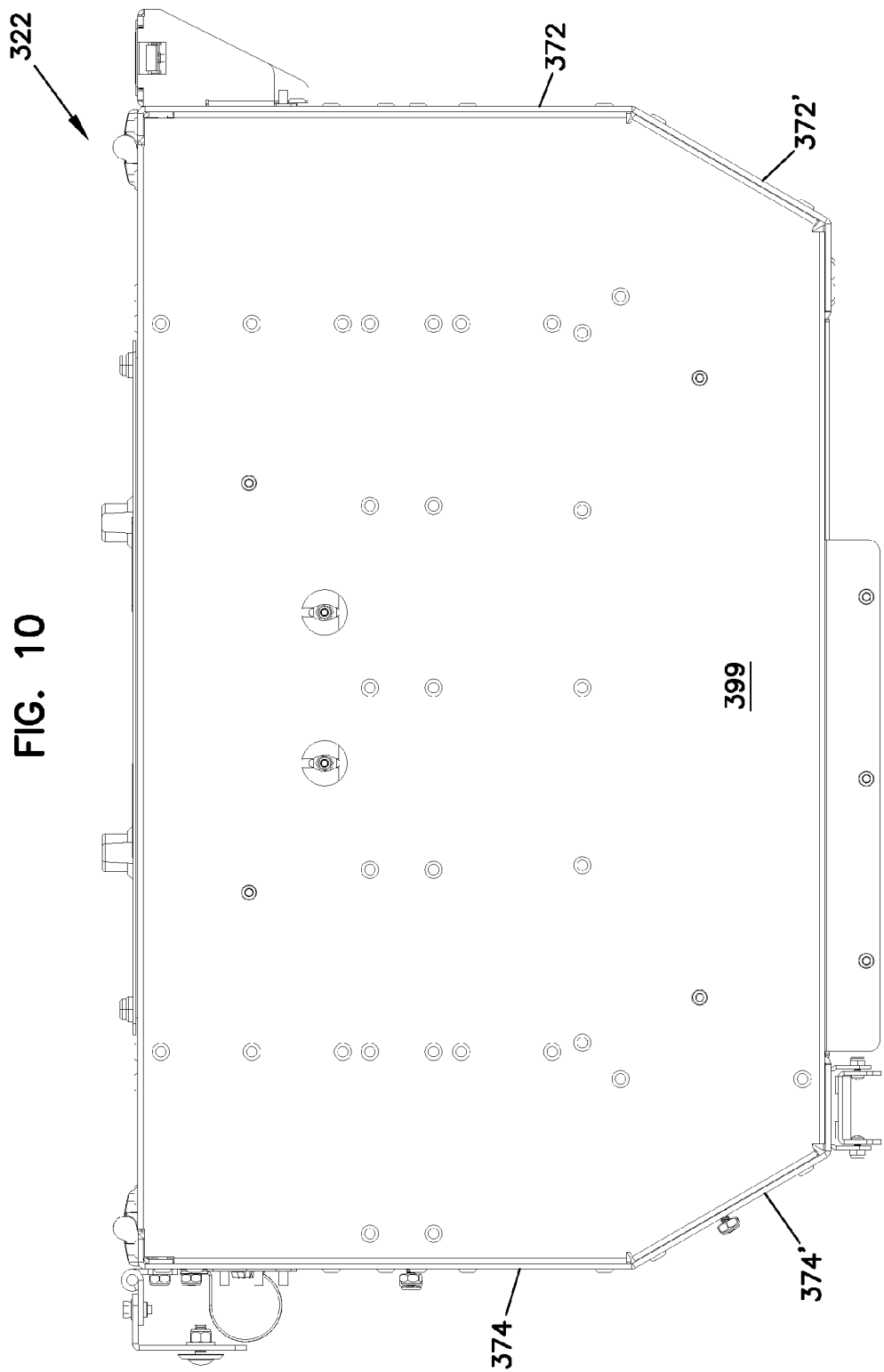
FIG. 10 shows a bottom view of the swing frame chassis of FIG. 3.
Figure 11:
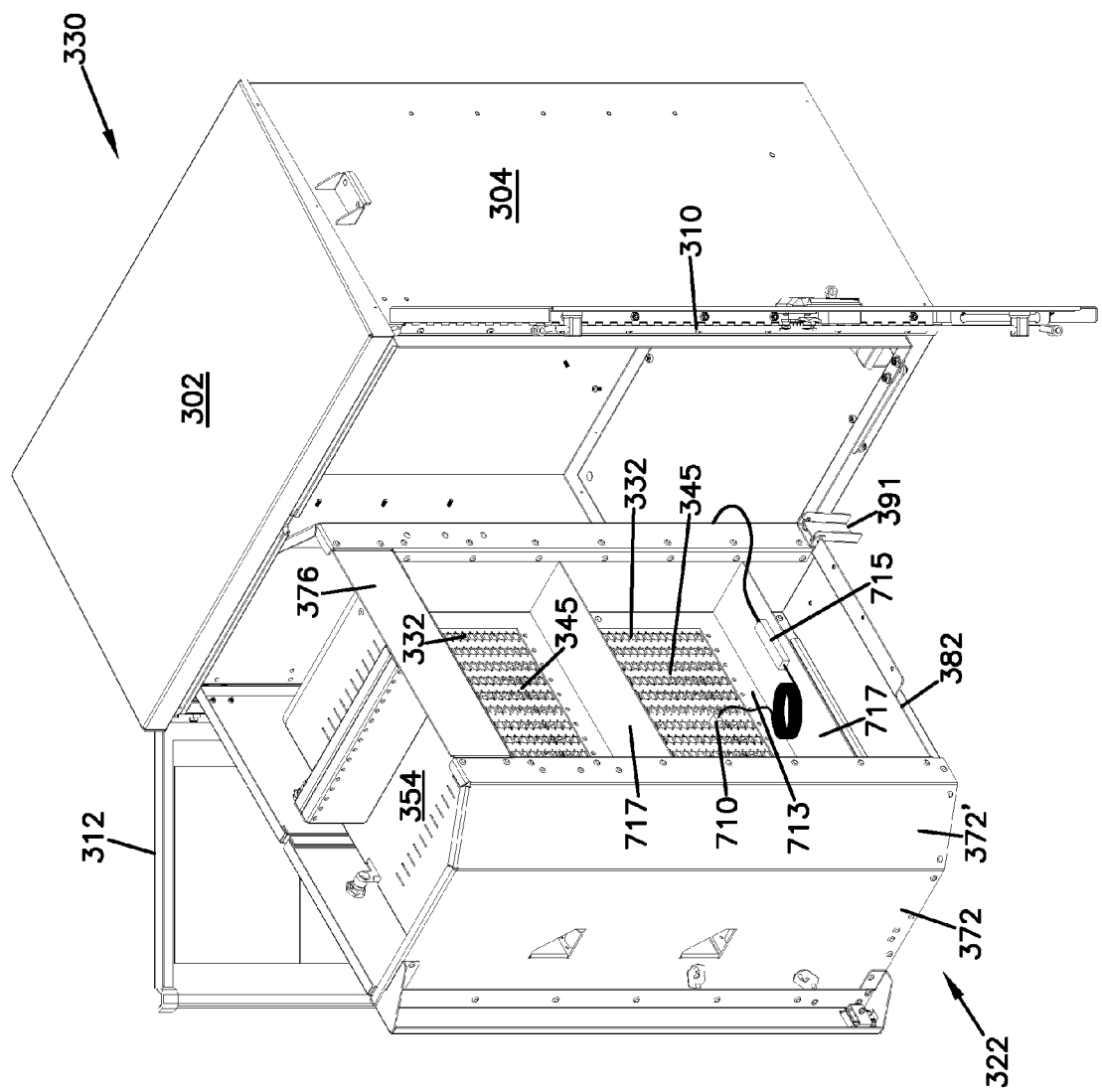
FIG. 11 shows a perspective view of the fiber distribution hub of FIG. 2 with the swing frame chassis swung outward.

Referring still to FIG. 11, the rear sides of the termination panels 345 are inset relative to the side walls/panels 372, 374 of the chassis 322. Thus, the side panels 372, 374 provide a protective shroud that extends rearwardly beyond the panels 345 so as to protect/shield connectors 710 terminated to the back side of the panels 345 from inadvertent contact when the chassis 322 has been swung open. As shown at FIGS. 9-11, the side panels 372, 374 include inward tapered portions 372', 374' adjacent the back of the chassis 322 to provide clearance for swinging the chassis 322 in and out of the enclosure 301.

In certain embodiments, panels 345 of the distribution cable connection region 352 can be fully loaded with adapters and pre-terminated in the factory with a stub cable containing 144 fibers, 216 fibers or 432 fibers. At the factory, connectorized ends of the stub cable fibers are inserted to the back sides of the adapters of the termination panel. The other ends of the stub cable fibers can be spliced or otherwise connected in the field to the fibers of a distribution cable routed from the FDH to subscriber locations.

The chassis 322 includes structure for managing the vertical routing of optical fibers within the chassis 322. For example, as shown in FIGS. 2, 4 and 5, chassis 322 includes a plurality of cable managers 384 (e.g., sleeves or rings) mounted to side panels 372, 374 of chassis 322. Typically, cable managers 384 are used to define vertical channels adapted to receive and organize splitter input fibers 702 that are routed vertically between feeder cable connection region 356 and splitter shelf 354, and also to receive and organize pigtails 704 that are routed downwardly from the splitter shelf 354 to connector storage panels 379 and to the distribution cable connection region 352. The chassis 322 defines open space between the vertical channels defined by the cable managers 384 and the front sides of the termination panels 345 so that the pigtails 704 can readily be laterally/horizontally routed from the vertical channels to the distribution cable connection location 352. To promote horizontal cable management, a plurality of cable management rings/guides 353 are positioned on horizontal shelves located in front of the termination panels 345.

As shown at FIGS. 4 and 5, connector storage panels 379 of FDH 330 are provided on doors 375, 377 of chassis 322. Also included on doors 375, 377 in the illustrated embodiment are fiber management channels 358. Cable guides 388 mounted on side panels 372, 374 and doors 375, 377 assist in the routing of the cables across the hinges of doors 375, 377 into connector storage panels 379. As described further below, currently unused connectorized fiber optic cables (i.e., cables that are not terminated on the distribution cable connection region 352) can be routed from one or more of the splitter modules in splitter shelf 354, through managers 384, 358, and stored at one of the plurality of adapters on connector storage panel 379 until needed.

Referring now to FIG. 11, in the example shown, chassis 322 is mounted to enclosure 301 of FDH 330 using one or more hinges 389 (see FIG. 2). Hinges 389 allow the entirety of chassis 322 of FDH 330, including feeder cable connection region 356, splitter shelf 354, and termination shelves 352, to be swung out of enclosure 301 of FDH 330 so as to cause side 374 of chassis 322 opposing hinge 389 to move away from the interior volume of enclosure 301. In example embodiments, chassis 322 can be pivoted ninety degrees or more out of enclosure 301 to allow access to optical components on the rear of chassis 322 for cleaning, testing, maintenance, additions, etc. For example, when chassis 322 is in the open position, as shown in FIG. 11, the rear sides of the termination panels 345 are accessible. In addition, splitter modules located in splitter shelf 354 (see FIGS. 19 and 20) are accessible through the open top of chassis 322 when chassis 322 is swung out of enclosure 301. In contrast, when chassis 322 is in the closed position (see FIG. 2), only components on front bulkhead 335 are readily accessible.

In example embodiments, chassis 322 includes a release latch 326 (see FIGS. 3 and 5) that locks chassis 322 in a closed position within enclosure 301 of FDH 330 until latch 326 is actuated. Once latch 326 is actuated, chassis 322 can be pivoted out of enclosure 301. In addition, a pivoting locking member 391 is mounted to rear panel 376 of chassis 322 to hold chassis 322 in the open position. For example, member 391 can be configured to automatically pivot downward into a locked position when chassis 322 is pivoted far enough so that member 391 clears enclosure 301 (e.g., at ninety degrees)

to maintain chassis 322 in the open position. To close chassis 322, member 391 can be pivoted upward and chassis 322 swung back into enclosure 301. Chassis 322, when equipped with member 391, can be referred to as a self-locking chassis.

In the embodiment shown, the entire chassis 322 is hinged providing a single point of flex for the fiber cable routed to the chassis. This hinge point is constructed to control the fiber bend. In particular, chassis hinge 389 and cable routing hardware (e.g., cable guides 388) are designed to ensure that manufacture recommended bend radii are maintained when the chassis is opened or closed.

In one embodiment, enclosure 301 can be configured at a factory, or plant, so as to have cable bundles dressed around hinge 389. Preconfiguring enclosure 301 reduces the chance that cabling will be done incorrectly.

Additional details regarding example fiber distribution hubs similar to FDH 330 can be found in U.S. patent application Ser. No. 11/203,157 filed on Aug. 15, 2005, the entirety of which is hereby incorporated by reference.

Referring now to FIGS. 13-18, an example optical splitter module 500 is shown. As noted above, splitter module 500 can be positioned in splitter shelf 354 of FDH 330 and functions to split a signal from a feeder cable into multiple signals on distribution fibers. In example embodiments, splitter module 500 can be a 1-to-8 splitter, a 1-to-16 splitter, or a 1-to-32 splitter. Alternative designs are possible.

Figure 21:
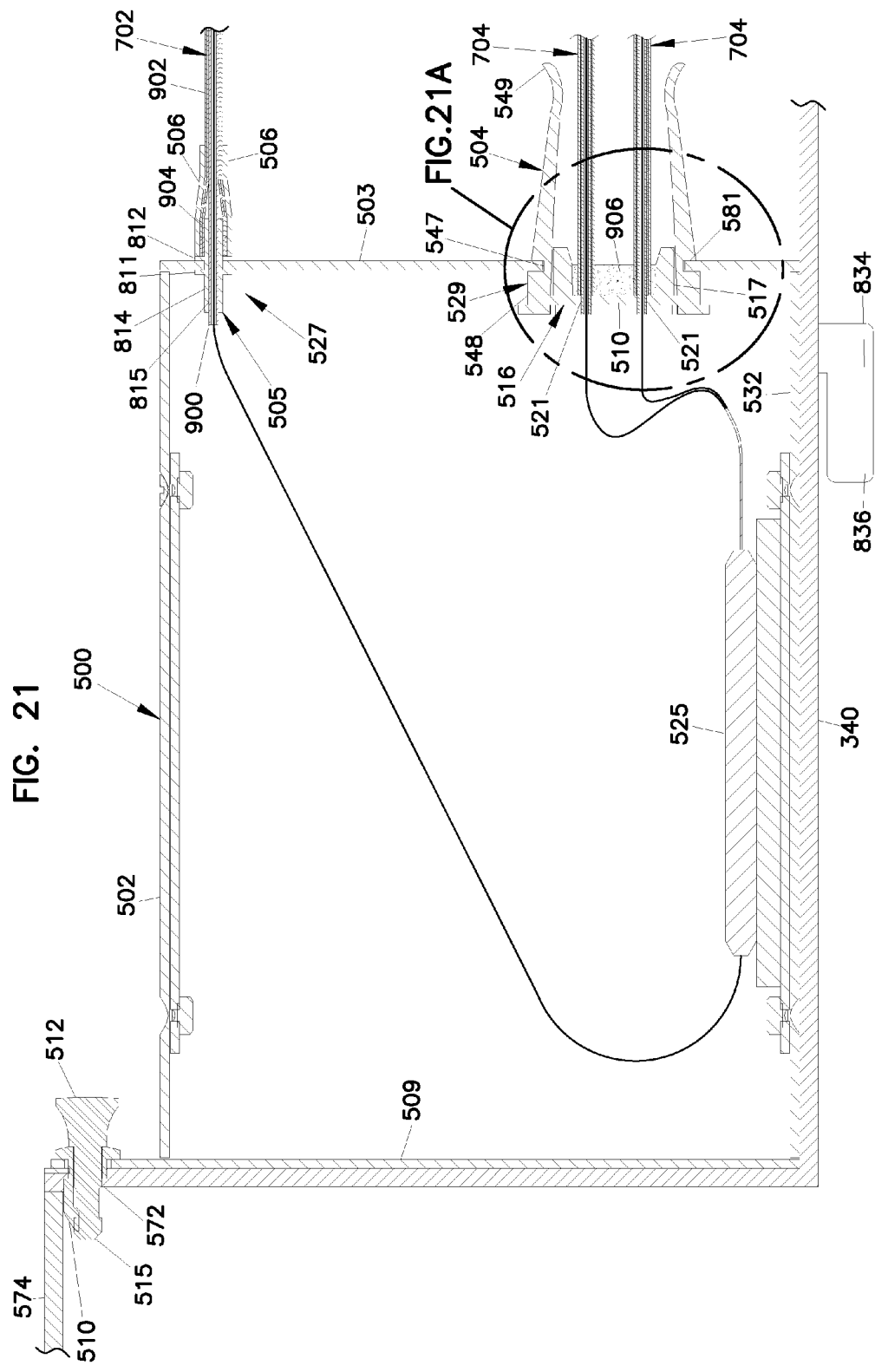
FIG. 21 shows a cross-sectional side view of a portion of the swing frame chassis and the optical splitter module of FIG. 19, with the cross-section through the optical splitter module taken along line 21-21 of FIG. 14.
Figure 22:
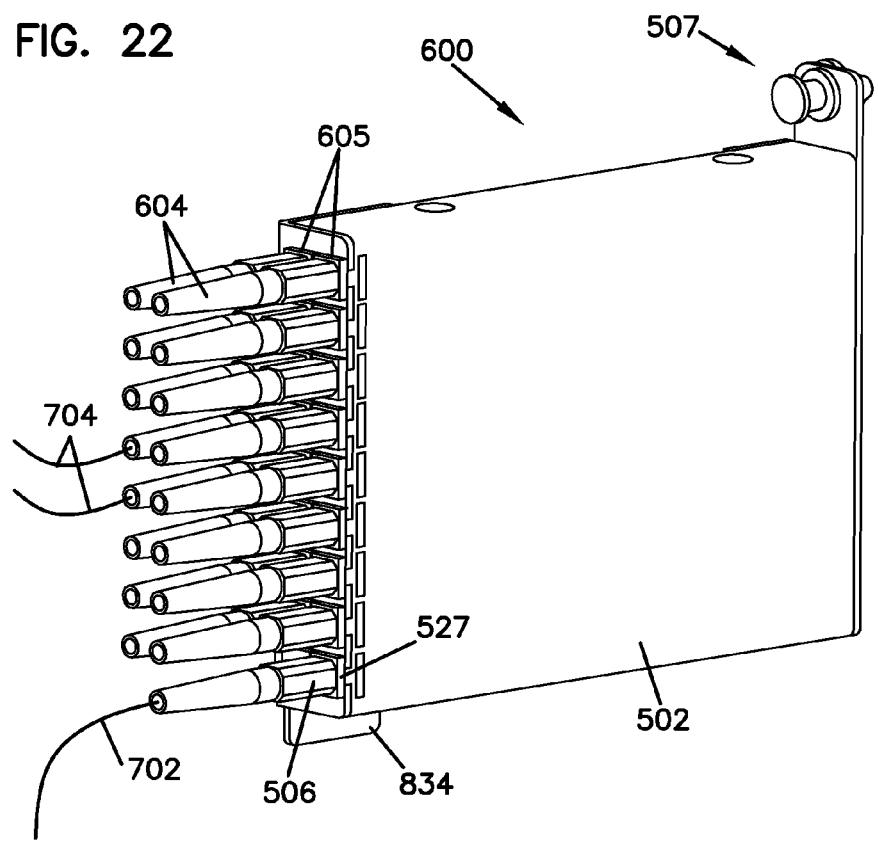
FIG. 22 shows a perspective view of another example optical splitter module.
Figure 23:
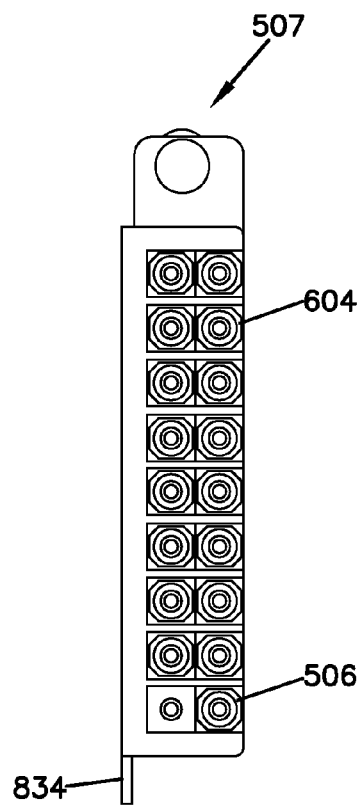
FIG. 23 shows a front view of the optical splitter module of FIG. 22.
Figure 24:
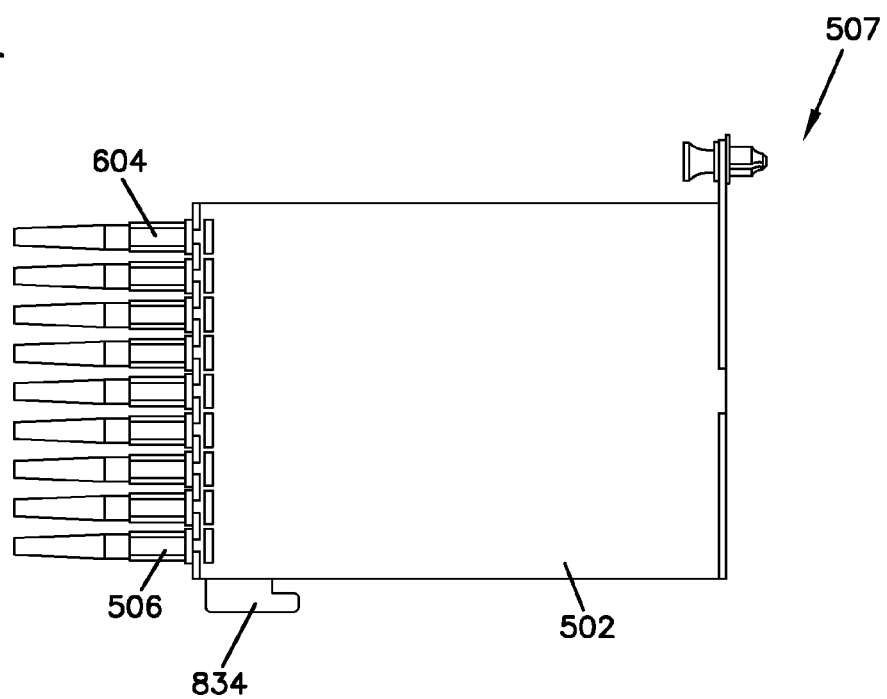
FIG. 24 shows a side view of the optical splitter module of FIG. 22.
Figure 25:
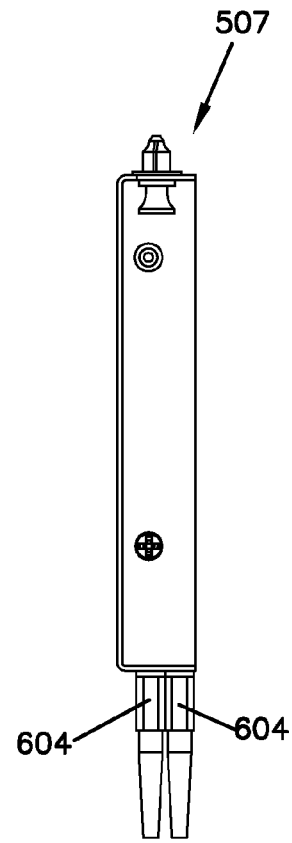
FIG. 25 shows a top view of the optical splitter module of FIG. 22.

The splitter module 500 includes a housing 502 for enclosing and protecting an optical component such as a conventional optical splitter 525 (see FIG. 21). The splitter module 500 also includes a splitter input fiber 702 and connectorized pigtails 704 that are all terminated to the splitter 525. The splitter input fiber 702 enters housing 502 at a first pass-through location 527, and the pigtails 704 (e.g., 8 pigtails, 16 pigtails, 32 pigtails or any other number of pigtails) exit the splitter housing 502 at a second pass-through location 529. The splitter 525 functions to split signals carried by the splitter input fiber 702 to the various pigtails 704. By way of example, 8, 16 or 32 pigtails can be terminated to splitter 525.

As shown at FIG. 21, the splitter input fibers 702 can each include a single fiber positioned within a buffer tube 900 encased within a jacket 902. Similarly, as shown best at FIG. 21A, pigtails 704 can each include a single fiber positioned within a buffer tube 900 encased within a jacket 902. Both the pigtail fibers and the splitter input fibers can be reinforced by strength members 904 such as Kevlar positioned between the jackets 902 and the buffer tubes 900.

Referring to FIGS. 13-16, splitter housing 502 has an envelope-style configuration that is generally rectangular and relatively narrow. The housing 502 includes opposing top and bottom walls 530, 532, opposing side walls 534, 536, and opposing end walls 503, 509. The top and bottom walls 530, 532 have lengths that extend between the end walls 503, 509, and widths that extend between side walls 534, 536. The housing 502 side walls 534, 536 define major sides of the housing 502 and include lengths that extend between the end walls 503, 509, and heights that extend between the top and bottom walls 530, 532. The end walls 503, 509 include widths that extend between the side walls 534, 536, and heights that extend between the top and bottom walls 530, 532. End wall 509 includes a top extension 519 (e.g., a flange or tab) that projects upwardly beyond the top wall 530.

Figure 13:
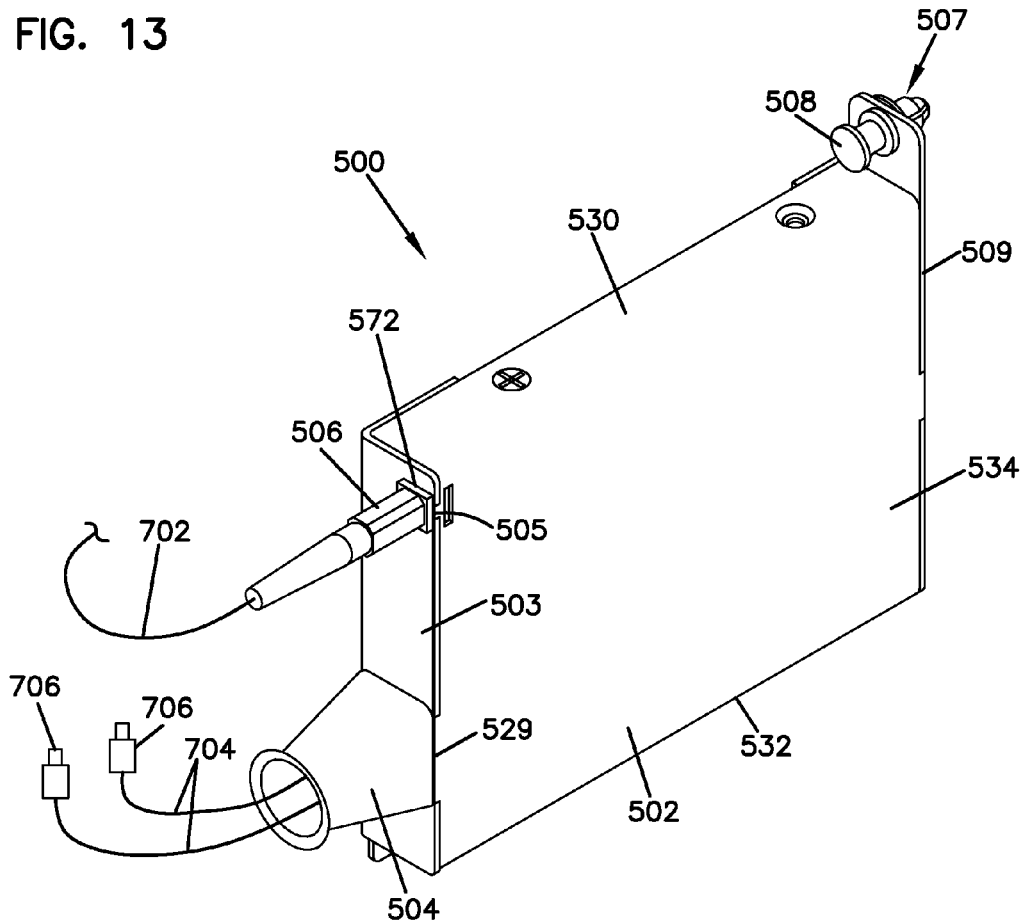
FIG. 13 shows a perspective view of an example optical splitter module.
Figure 14:
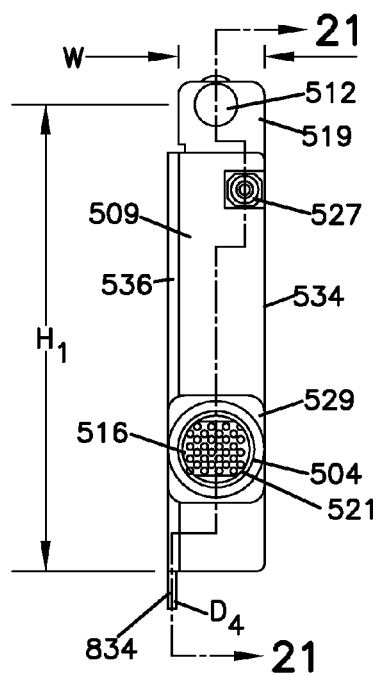
FIG. 14 shows a front view of the optical splitter module of FIG. 13.
Figure 15:
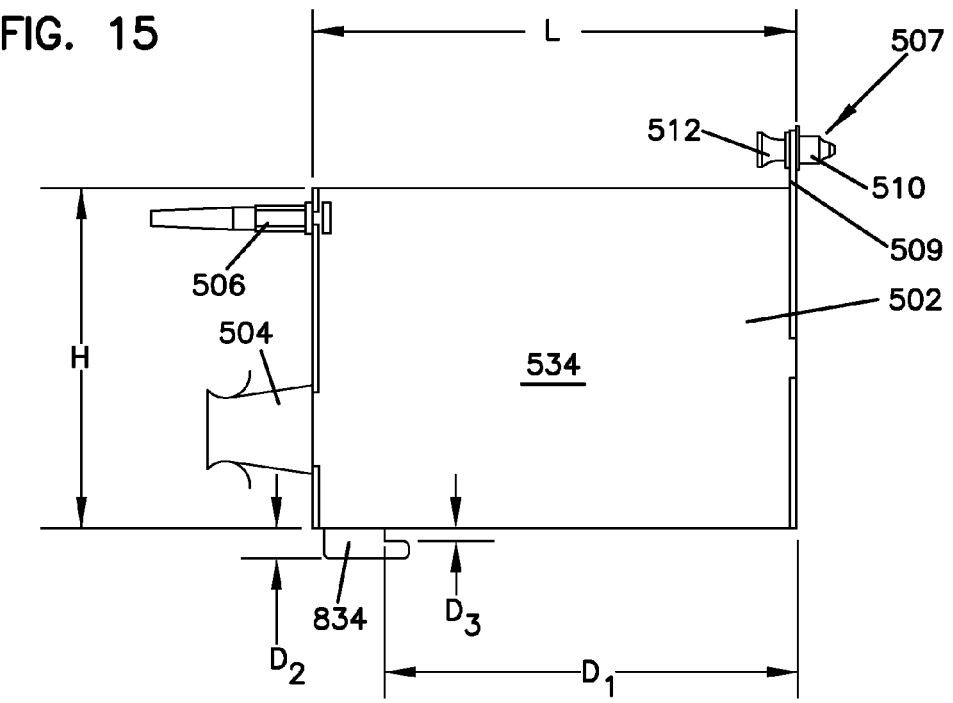
FIG. 15 shows a side view of the optical splitter module of FIG. 13.
Figure 16:
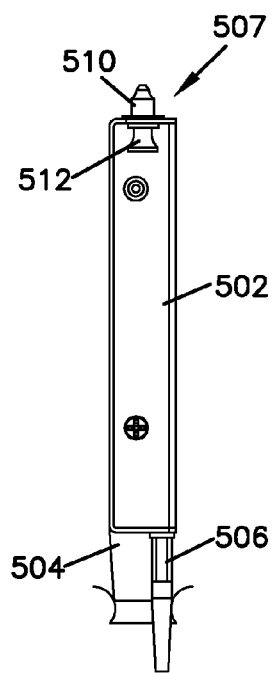
FIG. 16 shows a top view of the optical splitter module of FIG. 13.

Fiber access to the interior of the housing 502 is provided at end wall 503 of housing 502. For example, as shown at FIGS. 13, 14, and 21, first and second pass-through locations 527, 529 are provided at end wall 503. The first pass-through location 527 includes a pass-through member 505 mounted to the end wall 503. The pass-through member 505 includes inner and outer flanges 811, 812 between which a portion of end wall 503 is captured. As shown at FIG. 21, pass-through member 505 also includes a sleeve 814 that extends through a slot or other opening in the end wall 503. The splitter input fiber 702 extends through a fiber access passage 815 defined within the sleeve 814 to gain access to the interior of the housing 502. As depicted at FIG. 13, the splitter input fiber 702 can be reinforced by a strain relief boot 506 mounted at the end wall 503. In the illustrated embodiment, the boot 506 mounts over the outer end of the sleeve 814. Additionally, strength members 904 reinforcing the splitter input fiber can be crimped to the outer end of the sleeve 814.

The second pass-through location 529 is also provided at first end wall 503 of housing 502. As depicted at FIG. 21, second pass-through location 529 is defined by a rectangular opening 547 defined through end wall 503. A strain relief structure 504 (e.g., a boot or sleeve) is mounted at the opening 547. The strain relief structure 504 defines an interior passage sized to receive a plurality of separately jacketed fibers that form pigtails 704 of splitter module 500. The strain relief structure 504 is depicted as having a tapered, funnel-like configuration with a major end 548 located at the end wall 503 and a minor end 549 spaced outwardly from the end wall 503. The minor end 549 of the strain relief structure 504 flares outwardly in a curved manner to facilitate allowing fibers that pass through the strain relief structure to comply with minimum bend radius requirements. A groove structure 581 is provided at top and bottom sides of the strain relief structure 504 for securing the strain relief structure 504 to the end wall 503.

As shown at FIG. 21, portions of the end wall 503 fit within groove 581 to prevent movement of strain relief structure 504 relative to end wall 503. In one embodiment, strain relief structure 504 to flexes to maintain a specified bend radius for the fibers extending through strain relief structure 504 as the fibers are manipulated.

The second pass-through location 529 also includes a fiber separator 516 mounted to major end 548 of strain relief structure 504. The separator 516 includes a portion 517 (shown at FIG. 21) that fits within the interior of the strain relief structure 504. The separator 516 also includes a central region 510 defining a plurality of separate holes 521 (shown at FIG. 14) sized for each receiving separate buffer tubes 900 that surround fibers forming the pigtails 704. The holes 521 function to separate and provide cable management for the individual fibers that pass through the strain relief structure 504. As shown at FIG. 21A, adhesive 906 can be filled into the outer side of the separator 516 to secure the jackets, buffer tubes and reinforcing members of the pigtails to the separator 516.

In example embodiments, splitter 525 comprises a conventional passive splitting component configured for splitting a single optical signal into a plurality of optical signals. As depicted in FIG. 21, splitter 525 is mounted to bottom wall 532 of the housing 502.

The module 500 also includes structure for securing the module to splitter shelf 354. For example, module 500 includes a securement hook or fin 834 that projects downwardly from bottom wall 532 of the housing 502. The fin 834 is sized to fit through one of slots 576 defined through horizontal shelf member 340 of splitter shelf 354. Fin 834 includes a catch portion 836 (e.g., a tab or lip) adapted to slide under a portion of horizontal shelf member 340 (as shown at FIG. 21) to limit upward movement of the module relative to shelf 354. The main body of the fin 834 fits in relatively close tolerance within the sides of the slot 376. This resists movement of the module 500 in the directions included by arrows 900, 902 (see FIG. 19), and also resists twisting of the module 500 about vertical axis 904 (see FIG. 19).

The module 500 also includes a fastener 507 mounted to top extension 519 of end wall 509 of the housing 502. As described below, fastener 507 is adapted to snap within one of openings 572 of vertical wall 574 to secure second end 509 of module 500 to wall 574. In this way, when fastener 507 is locked in place, fastener 507 and wall 574 cooperate to limit sliding movement of the module 504 in the directions indicated by arrows 906, 908 (see FIG. 19).

Figure 17:
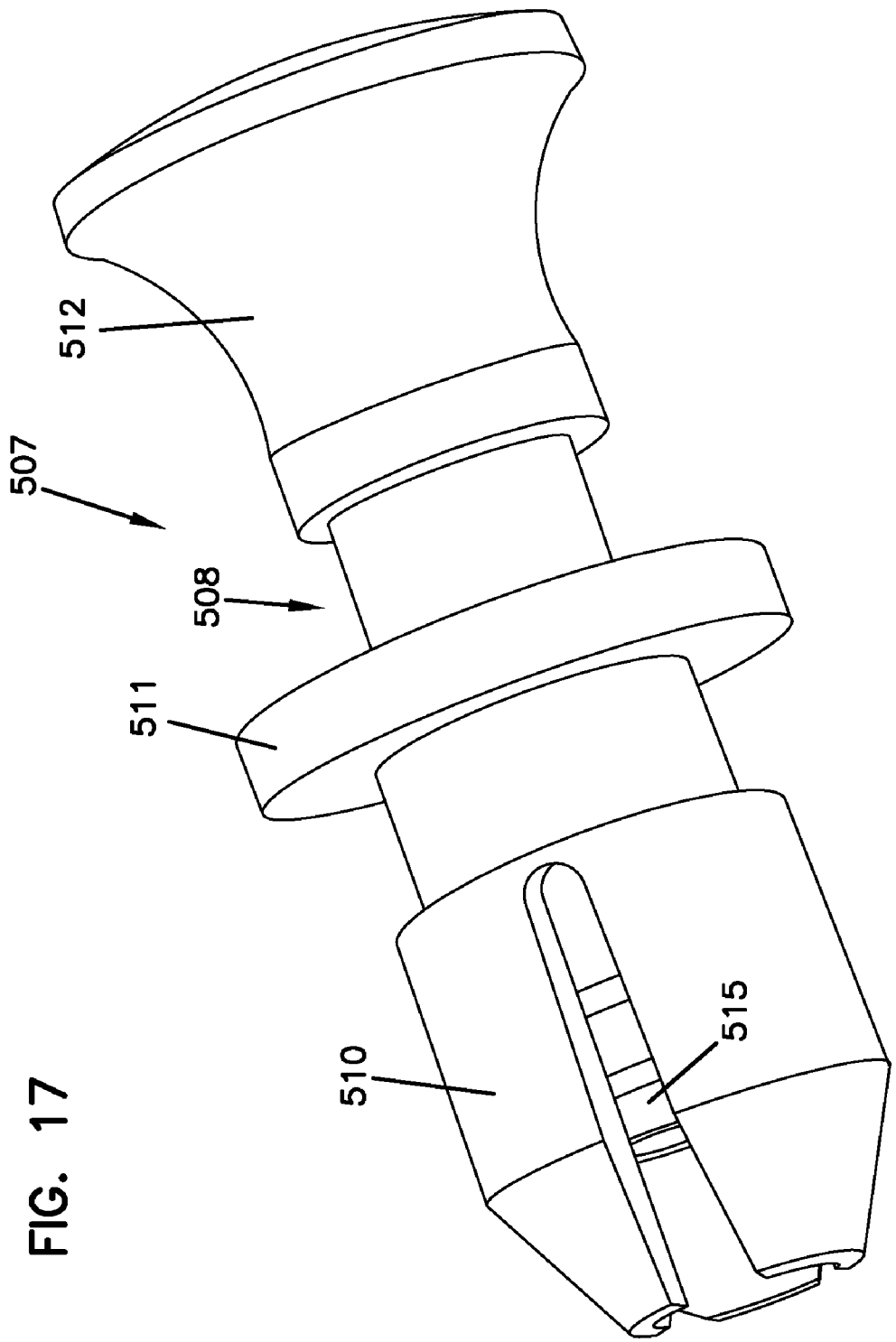
FIG. 17 shows a perspective view of an example pin of the optical splitter module of FIG. 13 in an unlocked position.
Figure 18:
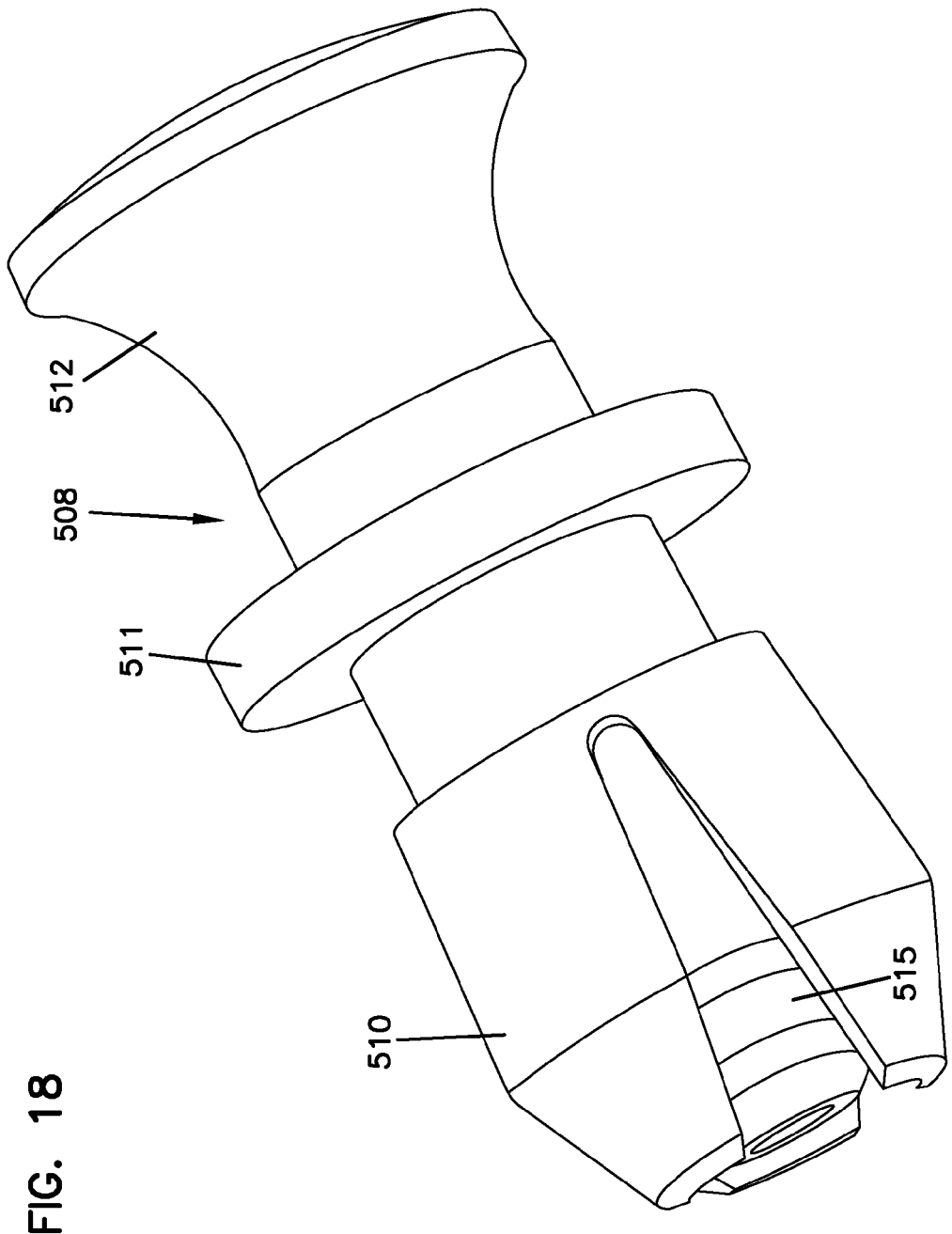
FIG. 18 shows another perspective view of the pin of the optical splitter module of FIG. 13 in a locked position.

Referring to FIGS. 17 and 18, fastener 507 includes a pin 508 having a handle 512 fixed to a portion 515 extending through a main body 511. A collet 510 is mounted to main body 511. In FIG. 17, handle 512 is shown in an unlocked position wherein handle 512 and portion 515 are pulled away from main body 511. In this unlocked position, collet 510 is in an unexpanded form. As handle 512 is pushed toward main body 511, portion 515 extends through and expands (e.g., increases in diameter) collet 510 into a locked position, as shown in FIG. 18.

Figure 20:
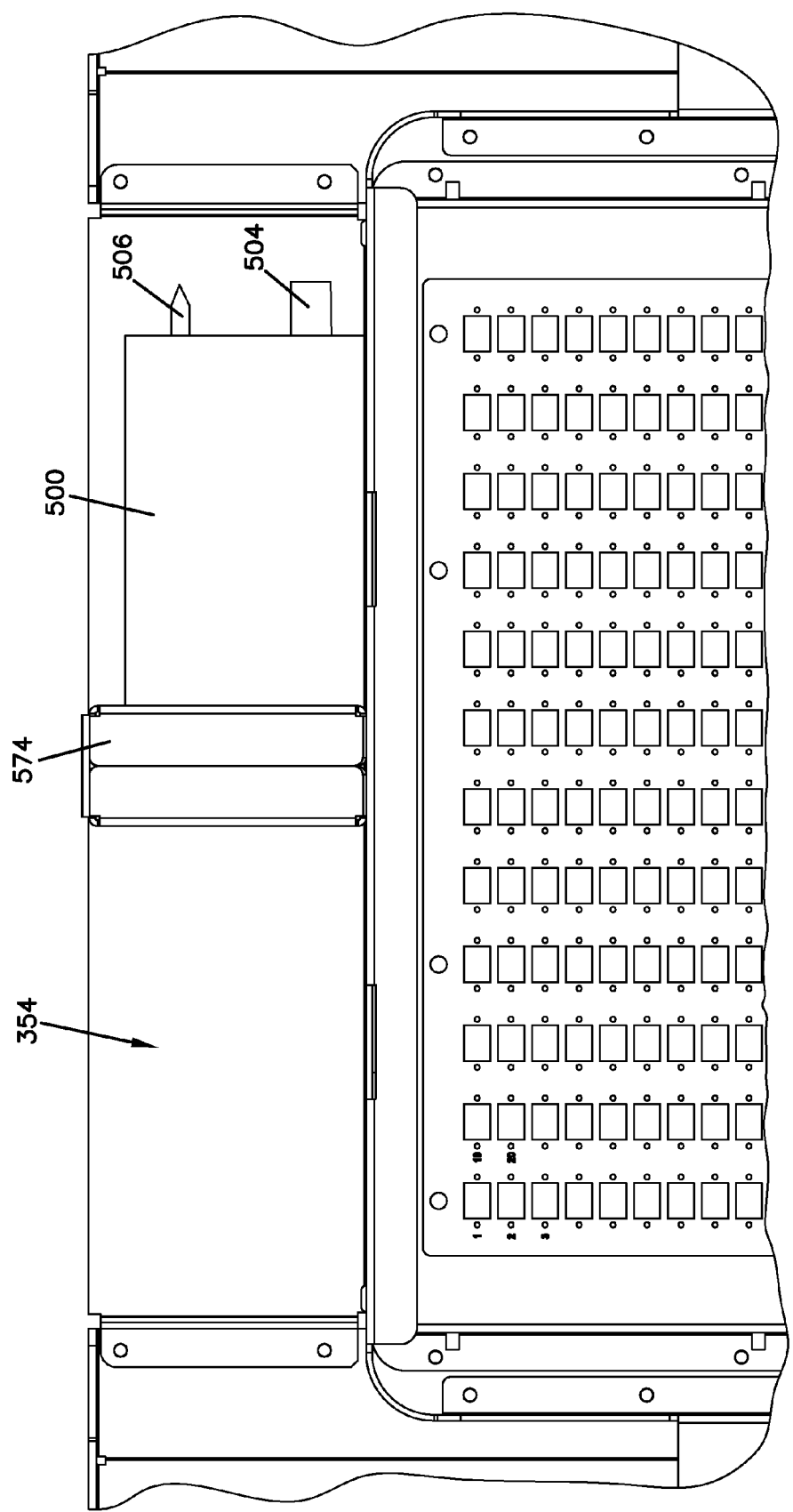
FIG. 20 shows a front view of the swing frame chassis and the optical splitter module of FIG. 19.

As shown in FIGS. 19-21, portion 515 and collet 510 are sized to fit into one of the plurality of holes 572 formed in the wall 574 of splitter shelf 354 when collet 510 is in the unexpanded form or unlocked position. When placed within a hole 572, handle 512 and portion 515 can be pushed towards main body 511 to expand collet 510 into its locked form which holds pin 508 within hole 572.

To install the module 500, the module 500 is manipulated such that the fin 834 is inserted into one of the slots 576. The module 500 is then slid in the direction indicated by arrow 906 until the second end 509 of the housing 502 abuts against the wall 574. As so positioned, the fastener 507 fits within a corresponding one of the openings 572, and the catch portion 836 of the fin 834 projects beyond the end of the slot 576 so as to hook beneath the under side of the horizontal shelf member 340 (see FIG. 21). In this way, fin 834 prevents module 500 from being lifted upwardly relative to the horizontal shelf member 355. To complete the installation, pin 508 of the fastener 507 is pushed inwardly to lock the fastener 507 within the corresponding opening 572. It will be appreciated that the process can be reversed to remove the module 500 from the splitter shelf 354.

When the modules 500 are mounted to the splitter shelf 354, the end walls 503 face toward the sides 372, 374 of the chassis 322. Thus, input fibers 702 and pigtails 704 can be routed directly laterally outwardly from the modules and then downwardly around the radius limiters. This type of routing configuration has a relatively small numbers of bends and allows for the effective use of fiber length to reach both the storage locations and the termination panels 345.

In example embodiments, splitter shelf 354 includes a plurality of holes 572 and slots 576 to accommodate a plurality of splitter modules 500 such as, for example, 16 or 32 modules. Splitter modules 500 can be added and removed from splitter shelf 354 as needed. Alternative designs are possible.

Referring again to FIGS. 14 and 15, in example embodiments, module housing 502 can have a width W of about 0.5 to 1 inch, or about 0.75 inches. Also, a length L can be about 4 to 6 inches, or about 4 to 5 inches, or about 4.75 inches. Additionally, a height H can be about 3 to 4 inches, or about 3 to 3.75 inches, or about 3.345 inches. Moreover, in some embodiments, a fastener height $H_1$ (shown at FIG. 14) can range from about 3.6 to 3.9 inches, or about 3.7 to about 3.75 inches, or around 3.725 inches. Additionally, a dimension $D_1$ of the module 500 can range from 3.75 to 4.25 inches, or from 3.9 to 4.1 inches, or about 4.04 inches. Further, the fin dimension $D_2$ can be 0.2 to 0.4 inches, or 0.25 to 0.35 inches, or about 0.3 inches. Additionally, fin gap spacing $D_3$ can range from about 0.075 to 0.2 inches, or about 0.1 to 0.15 inches, or about 0.25 inches. A width $D_4$ of fin 834 can range from about 0.02 to 0.10 inches, or about 0.04 to 0.08 inches, or about 0.048 inches. In other embodiments, dimensions other than those specified above can be used.

Referring now to FIGS. 22-25, another example embodiment of a splitter module 600 is shown. Splitter module 600 is similar to splitter module 500 described above and can be coupled to chassis 322 of FDH 330 in a similar manner. However, splitter module 600 includes a plurality of pass-through locations 605 with separate boots 604 for pigtails 704, instead of a single boot 504 included with module 500. One of the pass-through locations 527 allows a splitter input fiber to access the interior of the module. The remaining pass-through locations 605 and their corresponding boots 604 each corresponds to separate connectorized pigtails 704 that exit module 600. In the illustrated embodiment, splitter module 600 is configured to split the optical signal on the splitter input fiber into sixteen signals that exit module 600 through the connectorized pigtails 704.

From the forgoing detailed description, it will be evident that modifications and variations can be made in the devices of the disclosure without departing from the spirit or scope of the invention.

What is claimed is:

1. A splitter module for a fiber distribution hub, the splitter module comprising:
   a main body including a first side, an opposite second side, and third and fourth sides extending in a longitudinal direction from the first side to the second side, an optical splitter being positioned within the main body, and the first side of the main body defining at least one opening configured to allow a plurality of distribution fibers to exit the main body;
   at least one fin coupled to the main body, the fin defining a fin body including a first dimension and a second dimension extending perpendicularly to the first dimension, the first dimension extending in the longitudinal direction and being longer than the second dimension; and
   at least one aperture located at the second side of the main body and sized to receive a fastener to couple the splitter module to the fiber distribution hub.

2. The splitter module of claim 1, wherein the fastener is a pin.

3. The splitter module of claim 2, wherein the pin includes a collet sized to be received in the hole defined in a wall of a splitter tray of the fiber distribution hub.

4. The splitter module of claim 3, wherein the pin further includes a handle coupled to the collet, wherein the collet is configured to decrease a diameter of the collet as the handle is moved relative to the collet.

5. The splitter module of claim 4, wherein the collet is configured to be removed from the hole of the wall of the splitter tray when the handle is moved relative to the collet to decrease the diameter of the collet.

6. The splitter module of claim 1, wherein the fin includes a tongue sized to be received in a slot of a splitter tray of the fiber distribution hub.

7. The splitter module of claim 6, wherein the tongue is a catch portion adapted to slide under a portion of the splitter tray.

8. The splitter module of claim 1, further comprising a strain relief mechanism surrounding the opening in the first side of the main body, wherein the strain relief mechanism includes a boot sized to allow the distribution fibers to extend therethrough, wherein the boot is flexible to maintain a specified bend radius for the distribution fibers.

9. The splitter module of claim 1, wherein the first side of the main body defines another opening configured to receive an input fiber entering the main body.

10. The splitter module of claim 1, wherein the second dimension of the fin is sized to be received in a slot defined in a splitter tray of the fiber distribution hub.

11. The splitter module of claim 1, further comprising:
a strain relief mechanism surrounding the opening in the first side of the main body, wherein the strain relief mechanism includes a boot sized to allow the distribution fibers to extend therethrough, wherein the boot is flexible to maintain a specified bend radius for the distribution fibers;
wherein the fin is located on the third side of the main body and includes a tongue sized to be received in the slot and engage a splitter tray of the fiber distribution hub, the tongue being a catch portion adapted to slide under a portion of the splitter tray; and
wherein the aperture is defined through the second side of the body.

12. A splitter module for a fiber distribution hub, the splitter module comprising:
a main body including a first side, an opposite second side, and third and fourth sides extending in a longitudinal direction from the first side to the second side, an optical splitter being positioned within the main body, and the first side of the main body defining at least one opening configured to allow a plurality of distribution fibers to exit the main body;
a first securement location located at the third or fourth side, the first securement location including a fin coupled to the main body to engage the fiber distribution hub, the fin defining a fin body including a first dimension and a second dimension extending perpendicularly to the first dimension, the first dimension extending in the longitudinal direction and being longer than the second dimension; and
a second securement location located at the second side, the second securement location being configured to engage the fiber distribution hub.

13. The splitter module of claim 12, wherein the second securement location includes at least one aperture located at the second side of the main body and sized to receive a fastener to couple the splitter module to the fiber distribution hub.

14. The splitter module of claim 13, wherein the fin is received in a slot of the fiber distribution hub, and the fastener is received in the aperture to couple the splitter module to the fiber distribution module.

15. A fiber distribution hub, comprising:
an enclosure;
a splitter tray located at least partially within the enclosure, the splitter tray defining a slot extending longitudinally along a surface of the splitter tray, and an aperture; and
a splitter module including:
a main body including a first side, an opposite second side, and third and fourth sides extending in a longitudinal direction from the first side to the second side, an optical splitter being positioned within the main body, and the first side of the main body defining at least one opening configured to allow a plurality of distribution fibers to exit the main body;
at least one fin coupled to the main body, the fin defining a fin body including a first dimension and a second dimension extending perpendicularly to the first dimension, the first dimension extending in the longitudinal direction and being longer than the second dimension; and
at least one aperture located at the second side of the main body and sized to receive a fastener to couple the splitter module to the fiber distribution hub;
wherein the fin is received in the slot, and the fastener is received in the aperture to couple the splitter module to the splitter tray of the fiber distribution module.

16. The fiber distribution hub of claim 15, wherein the fastener is a pin.

17. The fiber distribution hub of claim 15, wherein the fin includes a tongue sized to be received in the slot and engage the splitter tray of the fiber distribution hub.

18. The fiber distribution hub of claim 15, further comprising a strain relief mechanism surrounding the opening in the first side of the main body, wherein the strain relief mechanism includes a boot sized to allow the distribution fibers to extend therethrough, wherein the boot is flexible to maintain a specified bend radius for the distribution fibers.

19. The fiber distribution hub of claim 15, wherein the splitter module further comprises:
a strain relief mechanism surrounding the opening in the first side of the main body, wherein the strain relief mechanism includes a boot sized to allow the distribution fibers to extend therethrough, wherein the boot is flexible to maintain a specified bend radius for the distribution fibers;
wherein the fin is located on the third side of the main body and includes a tongue sized to be received in the slot and engage a splitter tray of the fiber distribution hub, the tongue being a catch portion adapted to slide under a portion of the splitter tray; and
wherein the aperture is defined through the second side of the body.

* * * * *